United States Patent
Rossi et al.

(10) Patent No.: US 10,191,986 B2
(45) Date of Patent: Jan. 29, 2019

(54) WEB RESOURCE COMPATIBILITY WITH WEB APPLICATIONS

(71) Applicant: Microsoft Technology Licensing, LLC, Redmond, WA (US)

(72) Inventors: Jacob S. Rossi, Seattle, WA (US); John C. Jansen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 438 days.

(21) Appl. No.: 14/456,561

(22) Filed: Aug. 11, 2014

(65) Prior Publication Data

US 2016/0042070 A1    Feb. 11, 2016

(51) Int. Cl.
*G06F 17/30* (2006.01)
*G06F 8/656* (2018.01)

(52) U.S. Cl.
CPC ........ *G06F 17/30864* (2013.01); *G06F 8/656* (2018.02); *G06F 17/30554* (2013.01)

(58) Field of Classification Search
CPC ........... G06F 11/3668; G06F 17/30554; G06F 17/30864; G06F 8/67
See application file for complete search history.

(56) References Cited

U.S. PATENT DOCUMENTS

| | | | |
|---|---|---|---|
| 5,576,981 A | 11/1996 | Parker et al. | |
| 5,719,898 A | 2/1998 | Davidovici et al. | |
| 5,973,677 A | 10/1999 | Gibbons | |
| 5,974,549 A | 10/1999 | Golan | |
| 6,266,685 B1 | 7/2001 | Danielson et al. | |
| 6,337,924 B1 | 1/2002 | Smith | |
| 6,442,764 B1 | 9/2002 | Badillo et al. | |
| 6,691,176 B1 | 2/2004 | Narin et al. | |
| 6,918,066 B2 | 7/2005 | Dutta et al. | |
| 6,968,539 B1 | 11/2005 | Huang et al. | |

(Continued)

FOREIGN PATENT DOCUMENTS

| | | |
|---|---|---|
| CH | 687757 | 2/1997 |
| CN | 1825278 | 8/2006 |

(Continued)

OTHER PUBLICATIONS

"Foreign Office Action", CN Application No. 201210018531.4, dated Feb. 28, 2015, 12 pages.

(Continued)

*Primary Examiner* — Taelor Kim

(57) ABSTRACT

Techniques for web resource compatibility with web applications are described. According to one or more implementations, an indication of a request to navigate a web application to a web resource is received. Based on the request, a compatibility service is queried regarding compatibility status of the web resource with the web application. According to one or more embodiments, if a compatibility issue between the web resource and the web application is identified, a compatibility element is provided to mitigate the compatibility issue. At least some embodiments enable a user to provide feedback regarding presentation of the web resource by the web application with the compatibility element applied. At least some embodiments notify a developer of the web resource about a compatibility issue of the web resource with the web application.

20 Claims, 10 Drawing Sheets

(56) References Cited

U.S. PATENT DOCUMENTS

| | | |
|---|---|---|
| 7,055,146 B1 | 5/2006 | Durr et al. |
| 7,151,795 B1 | 12/2006 | Goldburg |
| 7,437,193 B2 | 10/2008 | Parramon et al. |
| 7,535,874 B2 | 5/2009 | Ozluturk et al. |
| 7,623,121 B2 | 11/2009 | Dodge |
| 7,626,358 B2 | 12/2009 | Lam et al. |
| 7,639,876 B2 | 12/2009 | Clary et al. |
| 7,653,893 B2 | 1/2010 | Neumann et al. |
| 7,681,208 B1 | 3/2010 | Pantuso et al. |
| 7,853,646 B2 | 12/2010 | Black et al. |
| 7,921,430 B2 | 4/2011 | Johnson et al. |
| 7,953,295 B2 | 5/2011 | Vincent et al. |
| 8,090,225 B2 | 1/2012 | Lapstun et al. |
| 8,111,988 B1 | 2/2012 | Schantz et al. |
| 8,141,059 B2 | 3/2012 | Ding et al. |
| 8,175,613 B2 | 5/2012 | Patil et al. |
| 8,363,036 B2 | 1/2013 | Liang |
| 8,370,629 B1 | 2/2013 | Ngo et al. |
| 8,401,054 B2 | 3/2013 | Myers et al. |
| 8,432,939 B2 | 4/2013 | Bhattad et al. |
| 8,490,084 B1* | 7/2013 | Alford ............... G06F 8/61 717/177 |
| 8,509,563 B2 | 8/2013 | Robinson et al. |
| 8,537,851 B1 | 9/2013 | Gossett et al. |
| 8,606,293 B2 | 12/2013 | Kim et al. |
| 8,634,386 B2 | 1/2014 | Jagger et al. |
| 8,634,849 B2 | 1/2014 | Jovicic et al. |
| 8,639,266 B2 | 1/2014 | Zelinka |
| 8,643,849 B2 | 2/2014 | Tao et al. |
| 8,655,944 B2 | 2/2014 | Silbey et al. |
| 8,700,060 B2 | 4/2014 | Huang |
| 8,780,232 B2 | 7/2014 | Craig et al. |
| 8,817,339 B2 | 8/2014 | Hinski |
| 8,826,190 B2 | 9/2014 | Kirkpatrick |
| 9,277,063 B2 | 3/2016 | Kido |
| 9,291,618 B2 | 3/2016 | Hendi |
| 9,397,723 B2 | 7/2016 | Hassan et al. |
| 9,444,702 B1 | 9/2016 | Raponi et al. |
| 9,501,701 B2 | 11/2016 | Wood et al. |
| 9,513,671 B2 | 12/2016 | Huston et al. |
| 9,524,429 B2 | 12/2016 | Zhang et al. |
| 9,558,170 B2 | 1/2017 | Barrus et al. |
| 9,705,637 B2 | 7/2017 | Hassan et al. |
| 9,805,483 B2 | 10/2017 | Wilson et al. |
| 9,824,269 B2 | 11/2017 | Zhang et al. |
| 2001/0009545 A1 | 7/2001 | Schilling |
| 2002/0015437 A1 | 2/2002 | Li et al. |
| 2002/0036253 A1 | 3/2002 | Lake |
| 2002/0186710 A1 | 12/2002 | Alvesalo et al. |
| 2002/0187799 A1 | 12/2002 | Haartsen |
| 2003/0061283 A1 | 3/2003 | Dutta et al. |
| 2003/0072467 A1 | 4/2003 | Brundage et al. |
| 2003/0088716 A1 | 5/2003 | Sanders |
| 2003/0110296 A1 | 6/2003 | Kirsch et al. |
| 2003/0126311 A1 | 7/2003 | Kushnirskiy et al. |
| 2003/0132916 A1 | 7/2003 | Kramer |
| 2003/0143956 A1 | 7/2003 | Taylor |
| 2003/0179731 A1 | 9/2003 | Noguchi et al. |
| 2004/0027387 A1 | 2/2004 | Nason et al. |
| 2004/0031030 A1 | 2/2004 | Kidder et al. |
| 2004/0100457 A1 | 5/2004 | Mandle |
| 2004/0120290 A1 | 6/2004 | Makhijani et al. |
| 2005/0094604 A1 | 5/2005 | Ozluturk et al. |
| 2005/0157459 A1 | 7/2005 | Yin et al. |
| 2005/0216471 A1 | 9/2005 | Yee et al. |
| 2005/0240949 A1 | 10/2005 | Liu et al. |
| 2005/0281321 A1 | 12/2005 | Bergstrom et al. |
| 2006/0068715 A1 | 3/2006 | Hundal et al. |
| 2006/0081714 A1 | 4/2006 | King et al. |
| 2006/0189353 A1 | 8/2006 | Fujishima |
| 2006/0197755 A1 | 9/2006 | Bawany |
| 2006/0238510 A1 | 10/2006 | Panotopoulos et al. |
| 2006/0270351 A1 | 11/2006 | Lastinger et al. |
| 2007/0022390 A1 | 1/2007 | Hillis et al. |
| 2007/0051766 A1 | 3/2007 | Spencer |
| 2007/0071072 A1 | 3/2007 | Banister et al. |
| 2007/0147226 A1 | 6/2007 | Khandekar et al. |
| 2007/0174846 A1 | 7/2007 | Johnson et al. |
| 2007/0180441 A1 | 8/2007 | Ding et al. |
| 2007/0189365 A1 | 8/2007 | Olsson et al. |
| 2007/0247338 A1 | 10/2007 | Marchetto |
| 2007/0283048 A1* | 12/2007 | Theimer ............ H04L 12/5835 709/246 |
| 2007/0297323 A1 | 12/2007 | Seki |
| 2008/0024502 A1 | 1/2008 | Nagahara et al. |
| 2008/0077855 A1 | 3/2008 | Lev et al. |
| 2008/0077941 A1 | 3/2008 | Holmes et al. |
| 2008/0104233 A1 | 5/2008 | Smith et al. |
| 2008/0104580 A1 | 5/2008 | Wilkinson |
| 2008/0165754 A1 | 7/2008 | Hu |
| 2008/0180411 A1 | 7/2008 | Solomon et al. |
| 2008/0215796 A1 | 9/2008 | Lam et al. |
| 2008/0232061 A1 | 9/2008 | Wang et al. |
| 2008/0232309 A1 | 9/2008 | McNew et al. |
| 2008/0309636 A1 | 12/2008 | Feng et al. |
| 2009/0007001 A1 | 1/2009 | Morin et al. |
| 2009/0102794 A1 | 4/2009 | Lapstun et al. |
| 2009/0187879 A1 | 7/2009 | Ao et al. |
| 2009/0189810 A1 | 7/2009 | Murray |
| 2009/0201850 A1 | 8/2009 | Davis et al. |
| 2009/0217241 A1 | 8/2009 | Motoyama et al. |
| 2009/0241020 A1 | 9/2009 | Hsiao |
| 2009/0250366 A1 | 10/2009 | Esfahani |
| 2010/0001963 A1 | 1/2010 | Doray et al. |
| 2010/0021022 A1 | 1/2010 | Pittel et al. |
| 2010/0075517 A1 | 3/2010 | Ni et al. |
| 2010/0146488 A1 | 6/2010 | Chen et al. |
| 2010/0188338 A1 | 7/2010 | Longe |
| 2010/0231556 A1 | 9/2010 | Mines et al. |
| 2010/0245221 A1 | 9/2010 | Khan |
| 2011/0066973 A1 | 3/2011 | Plom et al. |
| 2011/0083126 A1 | 4/2011 | Bhakta et al. |
| 2011/0093773 A1 | 4/2011 | Yee |
| 2011/0150070 A1 | 6/2011 | Kent et al. |
| 2011/0164813 A1 | 7/2011 | Enomoto |
| 2011/0167350 A1 | 7/2011 | Hoellwarth |
| 2011/0183678 A1 | 7/2011 | Kerpez et al. |
| 2011/0225490 A1 | 9/2011 | Meunier |
| 2011/0234502 A1 | 9/2011 | Yun et al. |
| 2011/0248941 A1 | 10/2011 | Abdo et al. |
| 2011/0299479 A1 | 12/2011 | Deb et al. |
| 2012/0071189 A1 | 3/2012 | Mody |
| 2012/0084345 A1 | 4/2012 | Silbey |
| 2012/0087078 A1 | 4/2012 | Medica et al. |
| 2012/0106082 A1 | 5/2012 | Wu et al. |
| 2012/0108180 A1 | 5/2012 | Shibuya |
| 2012/0170966 A1 | 7/2012 | Novak, Jr. |
| 2012/0173226 A1 | 7/2012 | McEvoy et al. |
| 2012/0174224 A1 | 7/2012 | Thomas et al. |
| 2012/0180002 A1 | 7/2012 | Campbell et al. |
| 2012/0189203 A1 | 7/2012 | Lin et al. |
| 2012/0192155 A1 | 7/2012 | Silbey et al. |
| 2012/0249300 A1 | 10/2012 | Avital et al. |
| 2012/0250644 A1 | 10/2012 | Sambhwani et al. |
| 2012/0263118 A1 | 10/2012 | Love |
| 2012/0270537 A1 | 10/2012 | Weng et al. |
| 2012/0280908 A1 | 11/2012 | Rhoads et al. |
| 2013/0050922 A1 | 2/2013 | Lee et al. |
| 2013/0076617 A1 | 3/2013 | Csaszar et al. |
| 2013/0093388 A1 | 4/2013 | Partovi |
| 2013/0106723 A1 | 5/2013 | Bakken et al. |
| 2013/0165142 A1 | 6/2013 | Huang |
| 2013/0179798 A1 | 7/2013 | Korupolu |
| 2013/0191715 A1 | 7/2013 | Raskovic et al. |
| 2013/0229386 A1 | 9/2013 | Bathiche |
| 2013/0242762 A1 | 9/2013 | Bennett et al. |
| 2013/0279098 A1 | 10/2013 | Cho |
| 2013/0288516 A1 | 10/2013 | Chang et al. |
| 2013/0301200 A1 | 11/2013 | Leung |
| 2013/0322423 A1 | 12/2013 | Park et al. |
| 2013/0335330 A1 | 12/2013 | Lane |
| 2013/0335902 A1 | 12/2013 | Campbell |
| 2013/0335903 A1 | 12/2013 | Raken |
| 2013/0342465 A1 | 12/2013 | Bathiche |

(56) References Cited

U.S. PATENT DOCUMENTS

| | | |
|---|---|---|
| 2013/0346636 A1 | 12/2013 | Bathiche |
| 2014/0028635 A1 | 1/2014 | Krah |
| 2014/0029183 A1 | 1/2014 | Ashcraft et al. |
| 2014/0036430 A1 | 2/2014 | Wroblewski et al. |
| 2014/0061406 A1 | 3/2014 | Chevalier et al. |
| 2014/0080501 A1 | 3/2014 | Lee et al. |
| 2014/0094165 A1 | 4/2014 | Karlsson et al. |
| 2014/0098485 A1 | 4/2014 | Vahid |
| 2014/0104279 A1 | 4/2014 | Albrecht |
| 2014/0117928 A1 | 5/2014 | Liao |
| 2014/0128091 A1 | 5/2014 | Engström |
| 2014/0156358 A1 | 6/2014 | Varadarajan et al. |
| 2014/0173402 A1 | 6/2014 | Bastide et al. |
| 2014/0173517 A1 | 6/2014 | Chaudhri |
| 2014/0187288 A1 | 7/2014 | Correll, Jr. |
| 2014/0328194 A1 | 11/2014 | Sen et al. |
| 2014/0341056 A1 | 11/2014 | Carbajal |
| 2015/0085683 A1 | 3/2015 | Sadek et al. |
| 2015/0277500 A1 | 10/2015 | Turowski et al. |
| 2015/0310043 A1 | 10/2015 | Adelman |
| 2016/0034001 A1 | 2/2016 | Huston et al. |
| 2016/0050529 A1 | 2/2016 | Hassan et al. |
| 2016/0055374 A1 | 2/2016 | Zhang et al. |
| 2016/0055659 A1 | 2/2016 | Wilson et al. |
| 2016/0056916 A1 | 2/2016 | Hassan et al. |
| 2016/0065265 A1 | 3/2016 | Hassan et al. |
| 2016/0073267 A1 | 3/2016 | Hassan et al. |
| 2016/0174226 A1 | 6/2016 | Porat et al. |
| 2016/0330744 A1 | 11/2016 | Hassan et al. |
| 2017/0109573 A1 | 4/2017 | Collet et al. |
| 2017/0116474 A1 | 4/2017 | Zhang et al. |

FOREIGN PATENT DOCUMENTS

| | | |
|---|---|---|
| CN | 101388057 | 3/2009 |
| CN | 101650659 | 2/2010 |
| CN | 101685487 | 3/2010 |
| CN | 101799855 | 8/2010 |
| CN | 102855232 | 1/2013 |
| DE | 202011103087 | 8/2011 |
| EP | 0611498 | 8/1994 |
| GB | 2178570 | 2/1987 |
| KR | 20030000579 | 1/2003 |
| NL | 1038411 | 5/2012 |
| WO | WO-2001058098 | 8/2001 |
| WO | WO-02069533 | 9/2002 |
| WO | WO-2009139789 | 11/2009 |
| WO | WO-2010011983 | 1/2010 |
| WO | WO 2010048746 | 5/2010 |
| WO | WO-2012171729 | 12/2012 |
| WO | WO-2013010323 | 1/2013 |

OTHER PUBLICATIONS

"Non-Final Office Action", U.S. Appl. No. 13/010,552, dated May 8, 2015, 27 pages.
"ABBYY FineReader", Available at: http://www.softexia.com/office-tools/abbyy-finereader/, Jul. 11, 2013, 10 pages.
"Cholesteric Liquid Crystal", Retrieved from: <http://en.wikipedia.org/wiki/Cholesteric_liquid_crystal> on Aug. 6, 2012, Jun. 10, 2012, 2 pages.
"Chronoscan", Available at: http://www.chronoscan.org/index.php?lang=en, Jan. 26, 2013, 3 pages.
"Final Office Action", U.S. Appl. No. 13/603,918, dated Mar. 21, 2014, 14 pages.
"i-Interactor electronic pen", Retrieved from: <http://www.alibaba.com/product-gs/331004878/i_Interactor_electronic_pen.html> on Jun. 19, 2012, 2012, 5 pages.
"International Search Report and Written Opinion", Application No. PCT/US2013/044871, dated Aug. 14, 2013, 12 pages.
"International Search Report and Written Opinion", Application No. PCT/US2015/022349, dated Jun. 25, 2015, 9 Pages.
"International Search Report and Written Opinion", Application No. PCT/US2013/044873, dated Nov. 22, 2013, 9 pages.
"International Search Report and Written Opinion", Application No. PCT/US2013/045049, dated Sep. 16, 2013, 9 pages.
"Introducing OmniPage Cloud Service", Available at: http://www.nuance.com/for-business/by-product/omnipage/omnipage-cloud-services/index.htm, Sep. 4, 2012, 3 pages.
"MPC Fly Music Production Controller", AKAI Professional, Retrieved from: <http://www.akaiprompc.com/mpc-fly> on Jul. 9, 2012, 4 pages.
"neXus Charging Cradle", Retrieved from <http://www.gen-xtech.com/neXus.php> on Jul. 28, 2014, Apr. 17, 2012, 2 pages.
"Non-Final Office Action", U.S. Appl. No. 13/603,918, dated Dec. 19, 2013, 12 pages.
"Non-Final Office Action", U.S. Appl. No. 14/468,699, dated May 15, 2015, 6 pages.
"OmniPage Standard 18", Available at: http://ocr-software-review.toptenreviews.com/omnipage-standard-review.html, Oct. 27, 2010, 3 pages.
"Pearl scan solutions", Available at: http://www.pearl-scan.co.uk/document-conversion/OCR-conversion.php, Aug. 21, 2008, 2 pages.
"Rechargeable Stylus Pen", Retrieved from <http://www.e-pens.com/uk/rechargeable-stylus-pen.html> on Jul. 28, 2014, Jul. 5, 2013, 1 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/603,918, dated Nov. 27, 2013, 8 pages.
"ScanSnap ix500 Scanning into Excel", Retrieved on: Feb. 20, 2014, Available at: http://www.youtube.com/watch?v=PvpH4NAzUjM, 2 pages.
"Scansnap", Available at: http://scanners.fcpa.fujitsu.com/scansnapit/scansnap-ix500.php, Jan. 11, 2013, 4 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"Write & Learn Spellboard Advanced", Available at <http://somemanuals.com/VTECH,WRITE%2526LEARN--SPELLBOARD--ADV--71000,JIDFHE.PDF>, 2006, 22 pages.
Bathiche,"Input Device with Interchangeable Surface", U.S. Appl. No. 13/974,749, filed Aug. 23, 2013, 51 pages.
Bohge,"The Use of Guard Bands to Mitigate Multiple Access Interference in the OFDMA Uplink", In Proceedings of 13th International OFDM-Workshop, Aug. 2008, 5 Pages.
Kang,"An Opportunistic Indoors Positioning Scheme Based on Estimated Positions", In Proceedings: IEEE Symposium on Computers and Communications, Jul. 5, 2009, 7 Pages.
Lane,"Media Processing Input Device", U.S. Appl. No. 13/655,065, filed Oct. 18, 2012, 43 pages.
Qin,"pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Van"Lenovo Thinkpad Tablet 2 Review", Retrieved from: <http://www.digitaltrends.com/tablet-reviews/lenovo-thinkpad-tablet-2-review/> Jan. 29, 2014, Feb. 12, 2013, 7 Pages.
Yucek,"A Survey of Spectrum Sensing Algorithms for Cognitive Radio Applications", In Proceedings: IEEE Communications Surveys & Tutorials, vol. 11 No. 1, Jan. 1, 2009, 15 pages.
"Final Office Action", U.S. Appl. No. 13/010,552, dated Oct. 9, 2015, 30 pages.
"Foreign Office Action", CN Application No. 201210018531.4, dated Sep. 0, 2015, 13 pages.
"International Search Report and Written Opinion", Application No. PCT/US2015/045985, dated Oct. 30, 2015, 10 Pages.

(56) References Cited

OTHER PUBLICATIONS

"International Search Report and Written Opinion", Application No. PCT/US2015/044402, dated Nov. 9, 2015, 10 pages.
"International Search Report and Written Opinion", Application No. PCT/US2015/045780, dated Oct. 22, 2015, 11 pages.
"International Search Report and Written Opinion", Application No. PCT/US2015/042551, dated Oct. 6, 2015, 13 Pages.
"International Search Report and Written Opinion", Application No. PCT/US2015/044944, dated Nov. 11, 2015, 13 pages.
"International Search Report and Written Opinion", Application No. PCT/US2015/045468, dated Oct. 29, 2015, 9 Pages.
"Non-Final Office Action", U.S. Appl. No. 14/229,507, dated Nov. 10, 2015, 11 pages.
"Non-Final Office Action", U.S. Appl. No. 14/450,023, dated Sep. 25, 2015, 18 pages.
"Non-Final Office Action", U.S. Appl. No. 14/468,699, dated Oct. 16, 2015, 8 pages.
"Non-Final Office Action", U.S. Appl. No. 14/477,014, dated Sep. 29, 2015, 18 pages.
Gao,"View: Visual Information Extraction Widget for Improving Chart Images Accessibility", Sep. 30, 2012, 4 pages.
Mishchenko,"Chart image understanding and numerical data extraction", Sixth International Conference on Digital Information Management (ICDIM), Sep. 26, 2011, 20 pages.
Savva,"ReVision: Automated Classification, Analysis and Redesign of Chart Images", Oct. 16, 2011, 10 pages.
"Final Office Action", U.S. Appl. No. 14/450,023, dated Feb. 2, 2016, 25 pages.
"International Search Report and Written Opinion", Application No. PCT/US2015/048218, dated Dec. 2, 2015, 11 pages.
"International Search Report and Written Opinion", Application No. PCT/US2015/045778, dated Dec. 15, 2015, 15 pages.
"Non-Final Office Action", U.S. Appl. No. 14/462,820, dated Dec. 21, 2015, 33 pages.
"Non-Final Office Action", U.S. Appl. No. 14/465,307, dated Jan. 29, 2016, 8 pages.
Embley,"Table-Processing Paradigms: A Research Survey", International Journal of Document Analysis and Recognition, vol. 8, No. 2-3, May 9, 2006, pp. 66-86.
Sadek,"Method and Apparatus for Performing Carrier Sense Adaptive Transmission in Unlicensed Spectrum", U.S. Appl. No. 61/981,608, filed Apr. 18, 2014, 41 pages.
"Foreign Office Action", CN Application No. 201210018531.4, dated Jun. 4, 2014, 16 pages.
"Final Office Action", U.S. Appl. No. 14/462,280, dated May 20, 2016, 34 pages.
"Final Office Action", U.S. Appl. No. 14/477,014, dated Jun. 8, 2016, 20 pages.
"International Preliminary Report on Patentability", Application No. PCT/US2015/044402, dated Jul. 8, 2016, 7 pages.
"International Preliminary Report on Patentability", Application No. PCT/US2015/044944, dated Jul. 21, 2016, 8 pages.
"Notice of Allowance", U.S. Appl. No. 14/465,307, dated Jun. 6, 2016, 7 pages.
"Second Written Opinion", Application No. PCT/US2015/045985, dated Aug. 1, 2016, 7 pages.
"Supplemental Notice of Allowance", U.S. Appl. No. 14/468,699, dated May 9, 2016, 4 pages.
"Supplemental Notice of Allowance", U.S. Appl. No. 14/468,699, dated Jun. 20, 2016, 4 pages.
"Final Office Action", U.S. Appl. No. 12/897,947, dated Dec. 19, 2012, 8 pages.
"Final Office Action", U.S. Appl. No. 13/010,552, dated Sep. 26, 2013, 22 pages.
"Final Office Action", U.S. Appl. No. 13/010,552, dated Oct. 23, 2014, 22 pages.
"How and Why Would Anyone Validate Their Code", Retrieved from: <http://designreviver.com/articles/how-and-why-would-anyone-validate-their-code/> on Nov. 11, 2010, Aug. 25, 2010, 9 pages.

"HP Code Advisor Version C.02.15 User's Guide", Hewlett-Packard Development Company L.P., Available at <http://docs.hp.com/en/14242/Cadvise_UG.pdf>,Jan. 2010, pp. 1-72.
"International Search Report and Written Opinion", Application No. PCT/US2012/021004, dated Jul. 30, 2012, 9 pages.
"Non-Final Office Action", U.S. Appl. No. 12/897,947, dated Jun. 7, 2012, 7 pages.
"Non-Final Office Action", U.S. Appl. No. 13/010,552, dated Jul. 8, 2014, 22 pages.
"Non-Final Office Action", U.S. Appl. No. 13/010,552, dated Aug. 12, 2013, 20 pages.
"Notice of Allowance", U.S. Appl. No. 12/897,947, dated Oct. 8, 2013, 8 pages.
"Restriction Requirement", U.S. Appl. No. 12/897,947, dated May 11, 2012, 7 pages.
"Understanding the Compatibility View List", Retrieved From: <http://msdn.microsoft.com/en-us/library/dd567845(v=vs.85).aspx> Jun. 11, 2014, Mar. 2011, 5 Pages.
"Visual Basic 6.0 Code Advisor", Retrieved from: <http://msdn.microsoft.com/en-us/vbasic/ms789135.aspx> on Nov. 11, 2010, 2006, 2 pages.
"Web Site Maintenance Tools, Software", Retrieved from: <http://websitetips.com/tools/> on Nov. 11, 2010, Nov. 11, 2010, 10 pages.
Chapman, "Review of Cross-Browser Testing Tools", Retrieved From: <http://www.smashingmagazine.com/2011/08/07/a-dozen-cross-browser-testing-tools/> Jun. 9, 2014, Aug. 7, 2011, 13 pages.
Choudhary, "Detecting Cross-browser Issues in Web Applications", In Proceedings: The 33rd International Conference on Software Engineering, May 21, 2011, 3 Pages.
Choudhary, et al., "Crosscheck: Combining Crawling and Differencing to Better Detect Cross-browser Incompatibilities in Web Applications", In Proceedings: IEEE Fifth International Conference on Software Testing, Verification and Validation, Apr. 17, 2012, 10 Pages.
Kim, "Chrome Extensions for Web Development", Retrieved from: <http://googlecode.blogspot.com/2010/05/chrome-extensions-for-web-development.html> on Nov. 11, 210, May 27, 2010, 4 pages.
Kristianto, "Cross Browser Compatibility Check Tools", Retrieved from: <http://www.ivankristianto.com/web-development/designs/cross-browser-compatibility-check-tools/1202/> on Nov. 11, 2010, Jan. 26, 2010, 14 pages.
Mesbah, et al., "Automated Cross-Browser Compatibility Testing", In Proceedings: the 33rd International Conference on Software Engineering, May 21, 2011, 10 Pages.
Ross, "IE9 Compat Inspector", Retrieved From: <http://blogs.msdn.com/b/ie/archive/2011/04/27/ie9-compat-inspector.aspx> Jun. 11, 2014, Apr. 27, 2011, 7 Pages.
"Second Written Opinion", Application No. PCT/US2015/044402, dated Apr. 6, 2016, 4 pages.
"Foreign Notice of Allowance", CN Application No. 201210018531.4, dated Feb. 4, 2016, 7 pages.
"Notice of Allowance", U.S. Appl. No. 14/468,699, dated Mar. 11, 2016, 8 pages.
"International Preliminary Report on Patentability", Application No. PCT/US2015/045780, dated Nov. 3, 2016, 5 pages.
"International Preliminary Report on Patentability", Application No. PCT/US2015/045985, dated Dec. 20, 2016, 8 pages.
"International Search Report and Written Opinion", Application No. PCT/US2015/048218, dated Dec. 15, 2016, 7 pages.
"Non-Final Office Action", U.S. Appl. No. 14/461,916, dated Jan. 17, 2017, 30 pages.
"Corrected Notice of Allowance", U.S. Appl. No. 14/450,023, dated Oct. 28, 2016, 2 pages.
"FOLDOC: Free On-Line Dictionary of Computing, definition for "Exception"", Retrieved from the Internet: http://web.archive.org/web/20100615211114/http://foldoc.org/exception—on Oct. 1, 2015, Jun. 15, 2010, 1 page.
"International Preliminary Report on Patentability", Application No. PCT/US2015/045468, dated Oct. 5, 2016, 6 pages.
"Non-Final Office Action", U.S. Appl. No. 14/462,820, dated Aug. 25, 2016, 27 pages.
"Non-Final Office Action", U.S. Appl. No. 14/477,014, dated Nov. 21, 2016, 21 pages.

(56) References Cited

OTHER PUBLICATIONS

"Notice of Allowance", U.S. Appl. No. 14/450,023, dated Aug. 24, 2016, 5 pages.
"Notice of Allowance", U.S. Appl. No. 14/465,307, dated Aug. 12, 2016, 8 pages.
"Second Written Opinion", Application No. PCT/US2015/045780, dated Jul. 12, 2016, 4 pages.
"Second Written Opinion", Application No. PCT/US2015/048218, dated Aug. 9, 2016, 6 pages.
"Corrected Notice of Allowance", U.S. Appl. No. 14/462,820, dated Jun. 14, 2017, 3 pages.
"Notice of Allowance", U.S. Appl. No. 14/465,317, dated Jun. 30, 2017, 9 pages.
"Notice of Allowance", U.S. Appl. No. 15/352,485, dated Jul. 31, 2017, 9 pages.
"Extended European Search Report", EP Application No. 12736753.0, dated Dec. 1, 2017, 7 pages.
"Non-Final Office Action", U.S. Appl. No. 15/211,305, dated Sep. 28, 2017, 9 pages.
"Notice of Allowance", U.S. Appl. No. 14/462,820, dated Mar. 2, 2017, 10 pages.
"Final Office Action", U.S. Appl. No. 14/477,014, dated May 31, 2017, 22 pages.
"Non-Final Office Action", U.S. Appl. No. 14/465,317, dated Mar. 24, 2017, 8 pages.
"Non-Final Office Action", U.S. Appl. No. 15/352,485, dated Apr. 7, 2017, 8 pages.

\* cited by examiner

WEB RESOURCE COMPATIBILITY WITH WEB APPLICATIONS

BACKGROUND

The web offers a vast amount of content in the form of billions of web pages that can be viewed using a variety of different browsers. Browser vendors invest large amounts of engineering resources to ensure browser compatibility with pages on the web. Nevertheless, compatibility issues still occur.

Conventional techniques to mitigate such compatibility issues typically employ tools that change a browser's behavior when browsing to a web page. However, discovery of compatibility issues and development of corresponding mitigations may depend on personnel to discover the issues and develop the mitigations.

Thus, current techniques for resolving compatibility issues of web pages and web applications are personnel and resource intensive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for web resource compatibility with web applications are described. According to one or more implementations, an indication of a request to navigate a web application to a web resource is received. Based on the request, a compatibility service is queried regarding compatibility status of the web resource with the web application.

According to various implementations, if there is a known compatibility issue with the web resource, a notification of the issue is received from the compatibility service. Included in the notification is a compatibility element to mitigate the compatibility issue. Responsive to the notification with the compatibility element being received, a visual indicator can be displayed to indicate that the compatibility element is applied to the web resource. In at least some implementations, the visual indicator enables a user to provide feedback regarding presentation of the web resource via the web application. At least some embodiments notify a developer of the web resource about a compatibility issue of the web resource with the web application.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
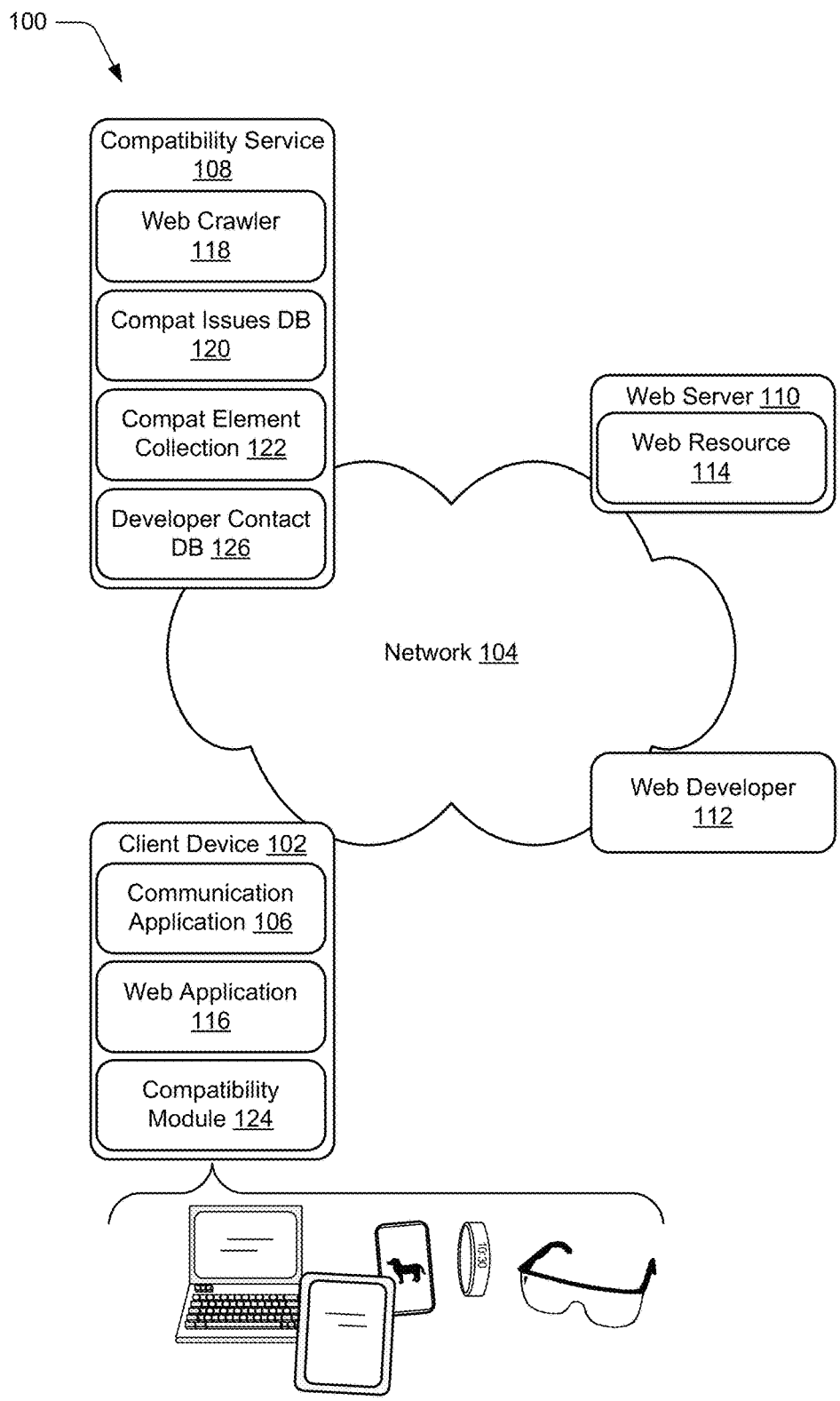
FIG. 1 is an illustration of an environment in an example implementation that is operable to employ techniques discussed herein.

Techniques for web resource compatibility with web applications are described. In at least some embodiments, compatibility issues with a web resource refer to compatibility problems between a web resource (e.g. a web page) and a web application with which the web resource is accessed, e.g., a web browser. Compatibility issues may be responsible for undesirable behaviors that occur in conjunction with access of a web resource, such as incorrect display, stall or crash of the web application, unresponsive features, and so forth. Examples of compatibility issues include an incompatible use of a particular application programming interface (API), an incompatible use of a user-agent string, an incompatible use of document modes, an incompatible use of URL character encoding, and so forth.

However, conventional techniques for addressing compatibility issues with web resources are limited because they rely heavily on personnel to discover the issues and develop fixes for them. The techniques discussed herein enable compatibility issues to be discovered and mitigated for web resources without involving personnel to discover and develop fixes for issues with each web resource.

To do so, a compatibility service may leverage known compatibility issues to identify web resources that may experience compatibility issues with a web application. The compatibility issues may be considered "known" insofar as they have been previously discovered and validated, such as by a vendor attempting to ensure that certain web sites remain compatible with its web application. According to various implementations, the compatibility service may leverage known compatibility issues by employing web crawlers to crawl web resources and look for patterns that are indicative of the known compatibility issues with a particular web application.

When the web crawlers find a web resource that exhibits such a pattern, the compatibility service can add the web resource to a compatibility list that identifies resources that have, or are likely to have, a compatibility issue with a web application. The information from the compatibility list can be used by the compatibility service when the web application requests access to a web resource, e.g., to notify the web application regarding whether there is a compatibility issue with the web resource.

Consider an example in which a request is received via a web application (e.g., a browser) to navigate to a web resource, e.g., a web page. For instance, a user provides input to a web browser to browse to a particular web page. Along with the request for the web resource, a query regarding compatibility of the web resource with the web application may be communicated to the compatibility service. The compatibility service may compare an identifier for the web resource to the compatibility list to ascertain if there are any known compatibility issues of the web resource with the web application.

If the compatibility list indicates that there is, or is likely to be, a known compatibility issue with the web resource, the compatibility service can determine whether to send a compatibility element configured to mitigate the compatibility issue. Generally, a compatibility element represents code that can be applied by a web application when it loads the web resource to mitigate the corresponding compatibility issue. According to various implementations, the compatibility service determines whether a client from which the query is received is included in a subset of clients (e.g., 1%) that requested the resource and are to receive the compatibility element. If the client is not included in the subset, then the compatibility service does not send the compatibility element to the client. If the client is included in the subset, the compatibility service sends the compatibility element to the client to be applied to the web resource.

The compatibility element may be sent to the client as part of a notification that indicates the known compatibility issue with the web resource relative to the web application. The compatibility element can be applied to presentation of the web resource via the web application to attempt to mitigate the known compatibility issue identified with the web resource. The notification may further include a visual indicator to be displayed that indicates the compatibility element is being applied to the web resource. The visual indicator may also enable a user to provide feedback regarding presentation of the web resource via the web application, such as whether the web resource is presented, with the compatibility element applied, as the user expects the web resource to be presented.

In response to feedback provided by the user, an indication of this feedback is sent to the compatibility service. Based on the feedback, the compatibility service can determine to increase the number of clients that are to receive the compatibility element (e.g., from 1% to 10%) or decrease the number of clients that are to receive the compatibility element (e.g., from 1% to 0.5%). If the feedback indicates the web resource is generally being presented as expected with the compatibility element applied, for instance, the compatibility service can increase the number clients that receive the compatibility element. However, if the feedback indicates the web resource is not generally being presented as expected with the compatibility element applied, the compatibility service can decrease the number of clients that receive the compatibility element.

According to various implementations, an entity that develops and/or maintains the web resource (a "web developer") can be notified of the compatibility element being applied to the web resource, and results (e.g., user feedback) pertaining to application of the compatibility element. For instance, when the user feedback indicates that the compatibility element is effectively mitigating the compatibility issue with the web resource, the compatibility service can notify a web developer responsible for the web resource. To do so, the compatibility service may access contact information maintained for the web developer. Using the contact information, the compatibility service may communicate a notification to the web developer that indicates the compatibility issue with the web resource, fixes for the compatibility issue (e.g., the compatibility element), and statistics describing feedback from users that received the compatibility element. In this way, a web developer may be informed about compatibility issues with the web resource to enable the web developer to apply fixes to mitigate the compatibility issues. Accordingly, fewer users of web applications that employ the techniques described herein may experience undesirable behaviors caused by compatibility issues.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for web resource compatibility with web applications described herein. Generally, the environment 100 includes various devices, services, and networks that enable communication via a variety of different modalities. For instance, the environment 100 includes a client device 102 connected to a network 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), a wearable computing device, and so forth.

The network 104 is representative of a network that provides the client device 102 with wired and wireless connectivity to various networks and/or services, such as the Internet. In this capacity, the network 104 can also provide wireless connectivity for the client device 102 and other wireless-enabled devices.

The network 104 is also representative of an infrastructure that supports network activity, and which includes different connected components that exchange, process, and/or route data among various entities. The network infrastructure, for instance, leverages different networks and/or sub-networks that can be provided and managed by different entities, such as Internet service providers (ISPs). For example, wireless access points that are connected to the network infrastructure (e.g., by a wired and/or wireless connection) may be leveraged to provide the network with wireless network connectivity, such as to the Internet, the web, other enterprise networks, and so forth.

In at least some embodiments, the infrastructure of the network 104 enables different forms of communication, such as transmission and receipt of voice data, video data, content data, and so forth.

Further, the network 104 may be provided and/or managed, in part, by a particular enterprise entity, such as a business entity, an educational institution (e.g., a university), a government institution, and so forth. The network 104 may provide the client device 102 with connectivity via a variety of different connectivity technologies, such as broadband cable, digital subscriber line (DSL), wireless data connectivity (e.g., WiFi™), T-carrier (e.g., T1), Ethernet, and so forth.

To communicate over the network 104, the client device 102 may employ a communication application 106. Generally, the communication application 106 is representative of functionality to enable different forms of communication via the client device 102. For instance, the communication application 106 represents functionality that enables the client device 102 to transmit and receive data via connection to the network 104. By way of example, the communication application 106 can enable voice communication (e.g., with a VoIP client), data communication (e.g., Internet data, email, and so forth), video communication, messaging communication (e.g., SMS or MMS), and combinations thereof. The communication application 106 also represents functionality to enable different communication modalities to be combined to provide diverse communication scenarios.

Also connected to the network 104 are a compatibility service 108, a web server 110, and a web developer 112. The compatibility service 108 represents functionality to perform various tasks for management of compatibility issues between web resources and web applications. The compatibility service 108, for instance, can manage discovery, mitigation, and reporting of compatibility issues between a web resource 114 and a web application 116. The web resource 114 may be made available by the web server 110 and the web application 116 provides the client device 102 with access to web resources via the network 104. Although the techniques described herein may be employed relative to a client "device", such techniques may also be employed relative to a client implemented in software. Thus, as used herein the term "client" may refer to a device, logic, combinations thereof, and so forth.

By way of example and not limitation, the web resource 114 may be configured as a web page and the web application 116 configured as a web browser. For instance, a user of the client device 102 may initiate navigation of the web application 116 to the web resource 114 in a variety of different ways, such as by typing an address of the web resource 114 into an address bar of the web application 116, selecting a hyperlink for the web resource 114, selecting a back or forward navigation button, and so forth. Alternately or additionally, the web application 116 may be configured as a search application that enables a user to type in a search term, view results of the search, and select a result corresponding to the web resource 114. Accordingly, an indication of a request to navigate the web application 116 to the web resource 114 may be received at the client device 102 in a variety of different ways.

In at least some scenarios, there may be compatibility issues between the web resource 114 and the web application 116 which can negatively affect a user's impression of the web resource 114, the web application 116, or both. To discover such compatibility issues, the compatibility service 108 employs web crawlers 118. Among other things, the web crawlers 118 can be employed to crawl web resources in search of patterns that are indicative of known compatibility issues.

The compatibility issues may be considered "known" for having been previously identified with a web resource, e.g., via different techniques for checking for compatibility between various web resources and the web application 116. Alternately or in addition, the web crawlers 118 represent functionality to inject script instrumentation tools into web resources to detect possible compatibility issues. Accordingly, the web crawlers 118 are configured to identify resources that have, or are likely to have, compatibility issues with the web application 116.

The compatibility service 108 also includes a compatibility issues database 120 ("compat issues DB 120"), which represents functionality to maintain a mapping of compatibility issues to web resources. A record in the compat issues DB 120 may indicate, for instance, that the web resource 114 is identified as having a compatibility issue with the web application 116. The information in the compat issues DB 120 may be generated based on information collected by the web crawlers 118 as a result of crawling web resources in search of compatibility issues.

According to various implementations, compatibility issues between web resources and web applications can be mitigated using compatibility elements, such as script shims. Generally, a compatibility element represents a portion of code that can be applied to mitigate a compatibility issue between a web application and a web resource. For example, a compatibility element can be implemented as injectable code configured to intercept calls made by a web resource and, by way of example and not limitation, change the arguments passed, handle operations associated with the calls, redirect such operations elsewhere, and so forth. A script shim, for instance, can be injected by a web application when launching a web resource to overcome a compatibility issue. Doing so may mitigate the effects of a compatibility issue when the web resource is accessed. A compatibility element collection 122 ("compat element collection 122") represents a collection of compatibility elements that are accessible to the compatibility service 108 and are individually configured to mitigate different known compatibility issues.

According to one or more implementations, the compatibility service 108 can configure communications to the client device 102 to include a compatibility element from the compat element collection 122. For example, the compatibility service 108 can configure a notification to the client device 102 to indicate that the web resource 114 has a compatibility issue with the web application 116. The compatibility service 108 can include in the notification a compatibility element from the compat element collection 122. When the compatibility element is applied as part of presentation of the web resource 114, a corresponding compatibility issue of the web resource 114 with the web application 116 may be mitigated.

The client device 102 further includes a compatibility module 124, which represents functionality to perform various tasks for management of compatibility issues at the client device. The compatibility module 124, for instance, can configure queries to the compatibility service 108 regarding web resource compatibility, cause compatibility elements to be applied, and cause feedback regarding applied compatibility elements to be returned to the compatibility service 108. The compatibility module 124 may be implemented as a software module, a hardware device, or using a combination of software, hardware, firmware, fixed logic circuitry, etc. Further, the compatibility module 124 may be implemented as a standalone component of the client device 102 as illustrated. In addition or alternatively, the compatibility module 124 may be configured as a component of the web application 116, an operating system, or other device application.

When a compatibility element is applied, the compatibility module 124 can cause display of a visual indicator via the web application 116 in conjunction with display of the web resource 114 to indicate to a user that the compatibility element is applied to the web resource 114. In at least some implementations, the visual indicator may enable a user to provide feedback regarding presentation of the web resource 114 via the web application 116.

By way of example, the visual indicator may enable a user to provide positive feedback regarding the presentation of the web resource (e.g., indicating that the web resource is presented as the user expects with the compatibility element applied) or negative feedback, e.g., indicating that the web resource is not presented as the user expects with the compatibility element applied.

As discussed above, the compatibility module 124 represents functionality to return feedback regarding applied compatibility elements to the compatibility service 108. The compatibility service 108 may utilize the feedback from client devices to perform a variety of tasks. For example, in response to positive feedback regarding application of a particular compatibility element to the web resource 114, the compatibility service 108 may increase a number of clients to which the compatibility element is sent.

However, if feedback is negative regarding application of a particular compatibility element to the web resource 114, the compatibility service 108 may decrease a number of clients to which the compatibility element is sent.

According to one or more implementations, the compatibility service 108 also represents functionality to report user feedback to the web developer 112 of the web resource 114. For example, the compatibility service 108 may include the feedback in a notification to the web developer 112 regarding a compatibility issue with the web resource 114. To notify the web developer 112, the compatibility service 108 may access contact information from a developer contact database (DB) 126.

According to various implementations, the developer contact DB 126 represents contact information that is maintained for developers of various web resources. An entry in the developer contact DB 126 may indicate, for instance, that the web developer 112 is the contact for the web resource 114. The entry may also indicate an email address, an instant messenger name, a phone number, a mailing address, or other information that suitable for contacting the web developer 112 about compatibility issues with the web resource 114.

By notifying the web developer 112 about compatibility issues with the web resource 114, compatibility issues may be fixed in an expedited manner. Consequently, fewer users may experience the undesirable behaviors that result from compatibility issues of the web resource 114 with the web application 116.

Having described an example environment in which the techniques described herein may operate, consider now a discussion of some example implementation scenarios for web resource compatibility with web applications in accordance with one or more embodiments.

Example Implementation Scenarios

The following section describes example implementation scenarios for web resource compatibility with web applications in accordance with one or more embodiments. The implementation scenarios may be implemented in the environment 100 discussed above, and/or any other suitable environment.

Figure 2:
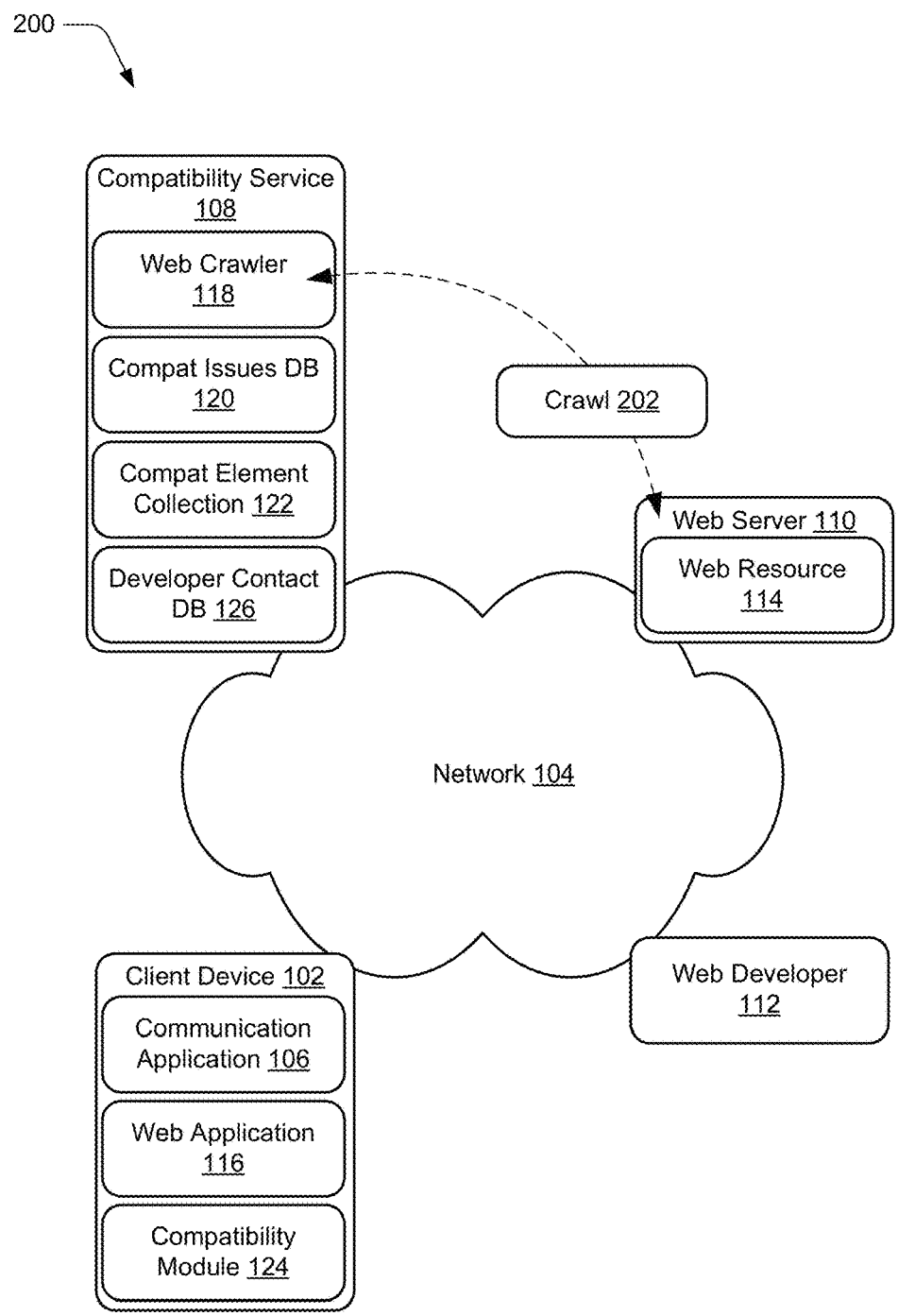
FIG. 2 illustrates an example implementation scenario for crawling a web resource in accordance with one or more embodiments.

FIG. 2 illustrates an example implementation scenario for crawling a web resource, generally at 200. The scenario 200 includes various entities and components introduced above with reference to the environment 100.

In the scenario 200, a crawl 202 of the web server 110, and thus also the web resource 114, is performed by the web crawler 118. The web crawler 118 may be configured generally as an Internet bot that systematically browses the World Wide Web for the purpose of web indexing. A provider of the compatibility service 108, for instance, may also provide a search service, e.g., a search engine. To enable the search service to provide relevant search results, the provider may employ web crawlers to index the web. While crawling to index the web, the web crawlers can also search for compatibility issues.

By way of example, the web crawler 118 may check the web resource 114 for compatibility issues with the web application 116 via the crawl 202. It is to be appreciated that the crawl 202 may also index the web server 110 and the web resource 114 for search purposes. According to various implementations, the crawl 202 may check whether the web resource 114 exhibits patterns indicative known compatibility issues. If the web crawler 118 discovers that the web resource 114 exhibits a pattern indicative of a known compatibility issue, the web resource 114 can then be identified as likely having a compatibility issue, e.g., with the web application 116.

Consider a pattern-matching example in which a particular web resource that uses an "attachEvent( )" application programming interface (API) has a known compatibility issue with the web application 116, e.g., the compatibility issue with the particular web resource has been validated by developers of the web application 116. Given this, the web crawler 118 may be configured to check, when crawling the web, whether web resources use the attachEvent( ) API. The resources that are determined to use the attachEvent( ) API may be considered likely to have a compatibility issue with the web application 116. If the crawl 202 reveals that the web resource 114 uses attachEvent( ) API, for instance, the web resource 114 may then be considered likely to have a compatibility issue with the web application 116.

Consider another pattern-matching example in which a mobile-specific web resource has a known (e.g., validated) compatibility issue with the web application 116. The web crawler 118 may therefore be configured to check, when crawling the web, whether web resources exhibit a pattern indicative of the compatibility issue with the mobile-specific web resource. Given the pattern matched by the web crawler 118, it may be determined whether a compatibility issue exists with a mobile version or a non-mobile version of the web resource 114.

The web resources that are determined to exhibit that pattern may then be considered likely to have a compatibility issue with the web application 116. If the crawl 202 reveals that the web resource 114 exhibits the pattern indicative of the compatibility issue with the mobile-specific web resource, for instance, the web resource 114 may then be considered likely to have a compatibility issue with the web application 116. Since this pattern is indicative of a known compatibility issue with a mobile-specific resource, its detection may also indicate that the web resource 114 is for mobile devices.

According to various implementations, a web resource identified by the crawl 202 to match such a pattern may be designated "likely" to have the compatibility issue. In other words, the web resource may be considered a candidate for having the compatibility issue with the web application 116. After a web resource is designated as likely having a compatibility issue, a validation process is performed to validate that there is a compatibility issue with the web resource.

As discussed above in relation to FIG. 1, the compat issues DB 120 may be populated using information collected by the web crawlers as a result of crawling the web. Consider again the example in which the crawl 202 reveals that the web resource 114 exhibits a pattern (e.g., behavior) indicative of a known compatibility issue. An indication that the web resource 114 is likely to have the known compatibility issue can be added to the compat issues DB 120. Accordingly, the compat issues DB 120 can include entries that map a web resource to both potential and validated compatibility issues.

Figure 3:
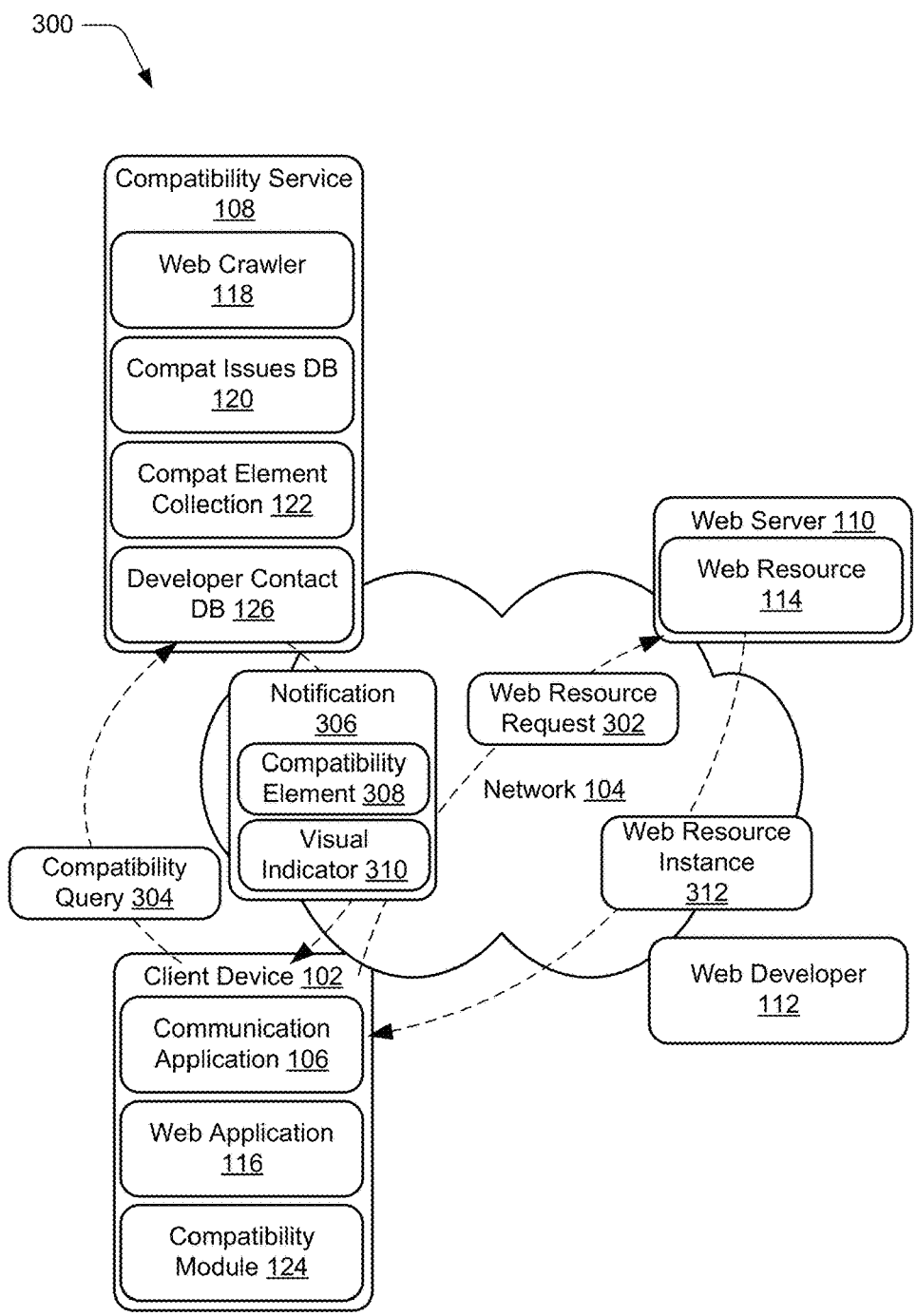
FIG. 3 illustrates an example implementation scenario for notifying a client about a compatibility issue with a web resource in accordance with one or more embodiments.

FIG. 3 illustrates an example implementation scenario for notifying a client about a compatibility issue with a web resource, generally at 300. In at least some embodiments, the scenario 300 represents a continuation of the scenario 200, discussed above.

In the scenario 300, a user provides input requesting the web resource 114, which results in communication of a web resource request 302 to the web server 110. In response to the request, a compatibility query 304 is submitted to the compatibility service 108 in conjunction with the web resource request 302. The compatibility query 304 may include an identifier for the web resource 114, such as a web address, a URL, a domain name, and so forth. In some implementations, the compatibility query 304 may be submitted separately from the web resource request 302. According to various implementations, the compatibility query 304 may be configured as a query to the compatibility service 108 regarding a compatibility status of the web resource 114 with the web application 116.

Responsive to receiving the compatibility query 304, the compatibility service 108 can search the compat issues DB 120 to ascertain whether a compatibility issue has been identified for the web resource 114. The compatibility service 108, for instance, searches the compat issues DB 120 using an identifier for the web resource 114 received as part of the compatibility query 304. If an entry in the compat issues DB 120 indicates that the web resource 114 has a compatibility issue or is likely to have a compatibility issue with the web application 116, the compatibility service 108 may notify the client device 102 about the ascertained compatibility issue.

When it is discovered that a web resource may have a compatibility issue, the compatibility service 108 may notify a subset of clients requesting the web resource about the compatibility issue. In this way, the compatibility service 108 may avoid notifying large numbers of clients about a "false positive", which is a web resource that a crawl identifies as exhibiting a pattern indicative of a compatibility issue but that in actuality has no such compatibility issue. The compatibility service 108 may be configured, for instance, to initially notify a small percentage of clients that request the web resource 114 (e.g., 1%) of a detected compatibility issue with the web resource 114.

To notify the client device 102, the compatibility service 108 configures a notification 306 for communication to the client device 102 that indicates the known compatibility issue with the web resource 114. As part of configuring the notification 306, the compatibility service 108 ascertains whether there is a compatibility element to mitigate the known compatibility issue. The compatibility service 108 can leverage functionality of the compat element collection 122 to do so. As described above, the compat element collection 122 includes compatibility elements configured to mitigate known compatibility issues of web resources with the web application 116. Thus, the compatibility service 108 can, for a known compatibility issue, select a corresponding compatibility element from the compat element collection 122. The compatibility service 108 may configure the notification 306 to include a compatibility element 308 to mitigate the compatibility issue. After configuring the notification 306, the compatibility service 108 can communicate the notification to the client device 102.

The notification 306 can also be configured to include a visual indicator 310 that is to be displayed to indicate that the compatibility element 308 is applied to the web resource 114. The compatibility element 308, for instance, may be applied in conjunction with access to a web resource instance 312 of the web resource 114 provided to the client device 102. By way of example, the client device 102 may receive the notification 306 from the compatibility service 108 and access to the web resource instance 312 of the web resource 114 from the web server 110 in response to the compatibility query 304 and the web resource request 302, respectively.

Responsive to the web resource 114 being presented via the web application 116, the compatibility module 124 may apply the compatibility element 308. This way, when the web resource is presented via the web application 116, the detected compatibility issue may be mitigated. In addition to applying the compatibility element 308, the visual indicator 310 may be displayed via the web application 116 to indicate to a user that the compatibility element 308 is applied. The visual indicator 310 may be configured for display as described further with reference to FIG. 5. Further, the visual indicator 310 may enable a user of the web application 116 to provide feedback regarding presentation of the web resource 114 via the web application 116.

Figure 4:
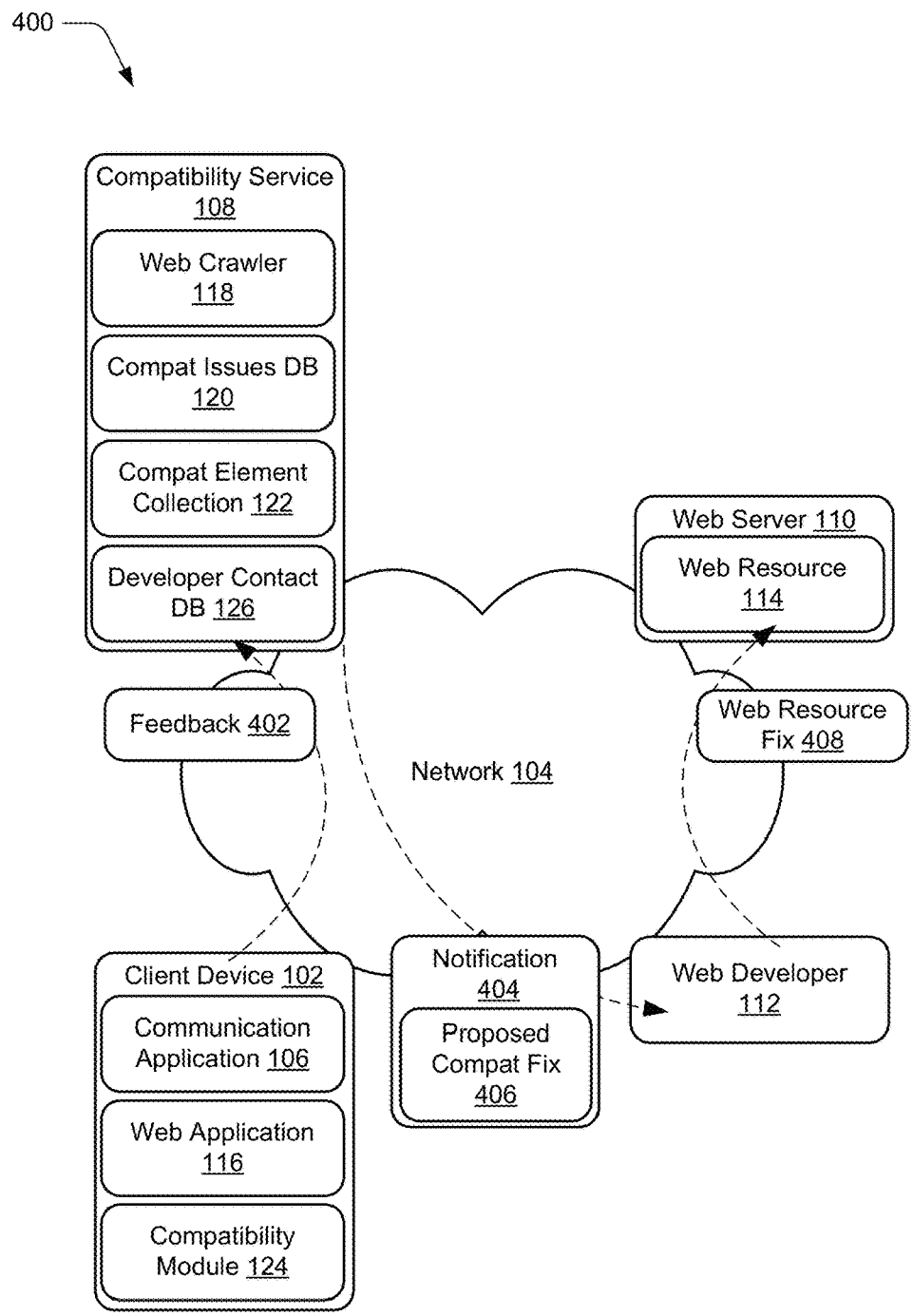
FIG. 4 illustrates an example implementation scenario for processing feedback regarding mitigation of a compatibility issue in accordance with one or more embodiments.

FIG. 4 illustrates an example implementation scenario for processing feedback regarding mitigation of a compatibility issue, generally at 400. The feedback processed in the example implementation scenario may also be used to validate a compatibility issue with a web resource as described in further detail below. In at least some embodiments, the scenario 400 represents a continuation of the scenario 300, discussed above.

In the scenario 400, the client device 102 communicates feedback 402 to the compatibility service 108. Generally, the feedback 402 is generated based on user input regarding presentation of the web resource 114 via the web application 116 with the compatibility element 308 applied. According to various implementations, the feedback 402 may be positive, negative, or neutral regarding presentation of the web resource 114 with the compatibility element 308 applied. Positive feedback, for instance, may result from a user selecting via the visual indicator 310 that the web resource 114 is presented, with the compatibility element 308 applied, as the user expects. Negative feedback, however, may result from a user selecting via the visual indicator 310 that the web resource 114 is not presented, with the compatibility element 308 applied, as the user expects.

The compatibility service 108 may use the feedback 402 to "flight" the clients that receive a notification with the compatibility element 308. As described above, the compatibility service 108 may initially provide a relatively small subset of clients (e.g., 1%) with a compatibility element to mitigate a likely compatibility issue with the web resource 114. Based on the feedback 402, the compatibility service 108 may change the percentage of clients that receive the compatibility element. For example, if feedback from the initial subset of clients is positive regarding the presentation of the web resource 114 with the compatibility element applied, the compatibility service 108 can increase a number of clients that are to receive the compatibility element 308. For example, the compatibility service 108 may increase the number of clients that receive the compatibility element 308 from 1% to 10%. Thus, 10% of the clients that query the compatibility service 108 for compatibility status of the web resource 114 with the web application 116 may receive the notification 306 with the compatibility element 308.

According to one or more implementations, selection of a subset of querying clients that are to receive the notification 306 with the compatibility element 308 may be performed in a variety of ways. For example, clients of the subset may be selected randomly. Alternately or additionally, the subset of clients may be selected according to location, such that the selected clients represent a variety of locations. The clients may be selected for the subset based on several other factors without departing from the scope of the techniques described herein including, but not limited to demographic data, internet usage data, and so forth.

Consider further the example implementation in which the compatibility service 108 has increased the number of clients that are to receive the compatibility element 308 to 10%. Based on feedback from the 10% of clients, the compatibility service 108 can again change the number of clients that are to receive the compatibility element 308. For example, if feedback from the 10% of clients is generally positive regarding presentation of the web resource 114 with the compatibility element 308 applied, the compatibility service 108 can again increase the number of clients that are to receive the compatibility element 308. The compatibility service 108 may increase the number of clients that receive the notification 306 and the compatibility element 308 to 50%, for example. This process may continue so that after another iteration the number of clients that receive the notification 306 and the compatibility element 308 is increased to 100% of requesting clients.

In contrast to this example in which feedback from the selected subsets of clients is generally positive, consider an example in which the feedback is instead negative. For example, feedback from the initial subset of clients (e.g., the 1% of clients) may be negative regarding presentation of the web resource 114 with the compatibility element 308 applied. In this case, the compatibility service 108 can decrease a number of clients that are to receive the compatibility element 308. The compatibility service 108 may, for instance, decrease the number of clients that receive the compatibility element 308 from 1% to 0.5%. Thus, 0.5% of the clients that query for a compatibility status of the web resource 114 with the web application 116 may receive the notification 306 with the compatibility element 308.

Based on feedback from the 0.5% of clients, the compatibility service 108 can again change the number of clients that are to receive the compatibility element 308. If feedback from the 0.5% of clients is also generally negative regarding presentation of the web resource 114, the compatibility service 108 can again decrease the number of clients that are to receive the compatibility element 308. The compatibility service 108 can lower the percentage from 0.5% to 0.1%, for example. According to various implementations, based on negative feedback, the compatibility service 108 may decrease the number of clients that are to receive the compatibility element 308 to zero.

Decreasing the number of clients that are to receive the compatibility element 308 to zero may indicate that the web resource 114 was falsely identified as having the known compatibility issue. Accordingly, the compatibility service 108 can notify clients to which a compatibility element is sent to disable and/or to not apply the compatibility element. The compatibility service 108 may, for instance, configure and communicate an updated notification to the clients that the compatibility element 308 is to be disabled and/or is no longer to be applied to the web resource. The compatibility service 108 may do so based on receiving negative feedback regarding presentation of the web resource 114 via the web application 116. Accordingly, the compatibility service 108 may limit a number of users that are notified regarding a "false-positive."

This process of gradually increasing or decreasing a number of clients to which the notification 306 and the compatibility element 308 is sent based on user feedback is generally referred to as "flighting." According to various implementations, flighting may be employed to validate a compatibility issue. For instance, rather than utilizing manual checking by personnel to validate the compatibility issue, the compatibility issue may be validated by user feedback that indicates effective mitigation by the compatibility element 308. The compatibility issue may be considered validated when positive feedback is received from at least a threshold number of clients regarding the mitigation. A compatibility issue may be considered invalidated, however, when negative feedback is received from a threshold number of clients regarding the mitigation.

Responsive to a compatibility issue being validated, the compatibility service 108 can notify the web developer 112 of the compatibility issue with the web resource 114. In the scenario 400, the compatibility service 108 provides the web developer 112 with a notification 404. Among other things, the notification 404 can indicate the compatibility issue with the web resource 114, and can include a proposed compatibility ("compat") fix 406. The proposed compat fix 406, for instance, represents information regarding how the web developer 112 may fix the compatibility issue with the web resource 114.

Additionally, the notification 404 may include statistics regarding the client devices that were provided with the compatibility element, how the client devices were selected, whether positive or negative feedback was provided (and how much), an indication of the compatibility element 308 employed to temporarily mitigate the issue, and so forth.

In the scenario 400, the web developer 112 provides a web resource fix 408 to the web server 110. The web resource fix 408 represents changes made by the web developer 112 to fix a compatibility issue with the web resource 114. For example, the web resource fix 408 may update pages of hypertext markup language (HTML) underlying the web resource 114, calls to application programming interfaces (APIs), and so on. Thus, compatibility of the web resource 114 with the web application 116 may be improved after being updated according to the web resource fix 408.

According to one or more implementations, the web developer 112 may register as being associated with the web resource 114. For example, the web developer 112 may register with the compatibility service 108 or with another service, such as a resource development service, a web hosting service, or the like. As part of doing so, the web developer may provide contact information, e.g., email address, phone number, mailing address, instant message name, development application identifier, username, and so on. Generally, the contact information enables the compatibility service 108 to communicate the notification 404 to the web developer 112. As described with reference to FIG. 5, the notification 404 may be displayed as a message via a developer tool interface.

According to various implementations, the developer contact DB 126 is included in the compatibility service 108, or is external to and accessible by the compatibility service 108. As the name suggests, the developer contact DB 126 includes contact information for developers, such as the contact information for the web developer 112. The developer contact DB 126 may also indicate that the web developer 112 is associated with the web resource 114. In this way, when a compatibility or other issue arises with the web resource 114, the web developer 112 may be contacted and notified accordingly.

Having discussed some example implementation scenarios, consider now a discussion of some example user interfaces in accordance with one or more embodiments.

Example User Interfaces

The following section describes example user interfaces for web resource compatibility with web applications in accordance with one or more embodiments. The user interfaces may be implemented in the environment 100 discussed above, and/or any other suitable environment. The user interfaces may also be employed as part of the example implementation scenarios described above.

Figure 5:
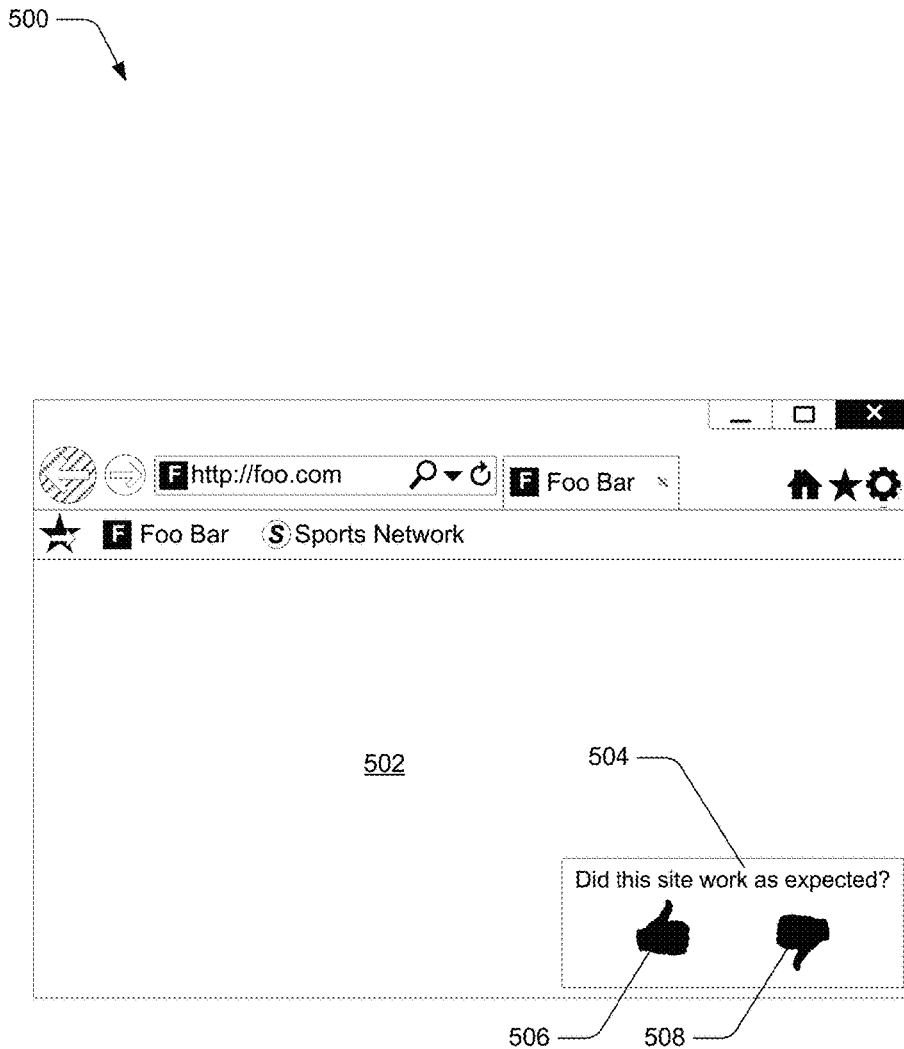
FIG. 5 illustrates an example implementation of a user interface for providing feedback regarding mitigation of a compatibility issue with a web resource in accordance with one or more embodiments.

FIG. 5 illustrates at 500 an example user interface 502. The user interface 502 represents a user interface of a web application (e.g., the web application 116) that is configured to display a visual indicator 504. In the illustrated example, the web application 116 may be configured as a browser suitable for displaying a web resource (e.g., the web resource 114), which in this example corresponds to the web page "foo.com." The web page "foo.com," for example, corresponds to the web resource instance 312 discussed above with reference to scenario 300.

The visual indicator 504 can indicate to a user that a compatibility element is applied to mitigate a compatibility issue of "foo.com" with the web application 116. Additionally, the visual indictor 504 enables a user to provide feedback regarding presentation of "foo.com" via the web application 116. For example, the visual indicator 504 may enable a user to provide feedback that indicates whether "foo.com," when presented via the user interface 502 of the web application 116 and with a compatibility element applied, is presented as the user expects.

To do so, the visual indicator 504 may enable a user to provide positive or negative feedback regarding presentation of "foo.com" via the web application 116. In the illustrated example, the user may select a positive-feedback control 506 of the visual indicator 504 to provide positive feedback. To provide negative feedback, the user may select a negative-feedback control 508 of the visual indicator 504. Selection of either the positive-feedback control 506 or the negative-feedback control 508 can initiate communication of the feedback 402 to the compatibility service 108.

Although the positive-feedback control 506 and the negative-feedback control 508 are illustrated, the visual indicator 504 may enable a user to provide feedback regarding presentation of the web resource 114 in other ways without departing from the spirit and the scope of the techniques described herein. By way of example and not limitation, the visual indicator 504 may enable a user to provide feedback about presentation of the web resource by typing in comments, selecting a number on a scale from one to ten, selecting the words "YES" or "NO", and so forth.

Figure 6:
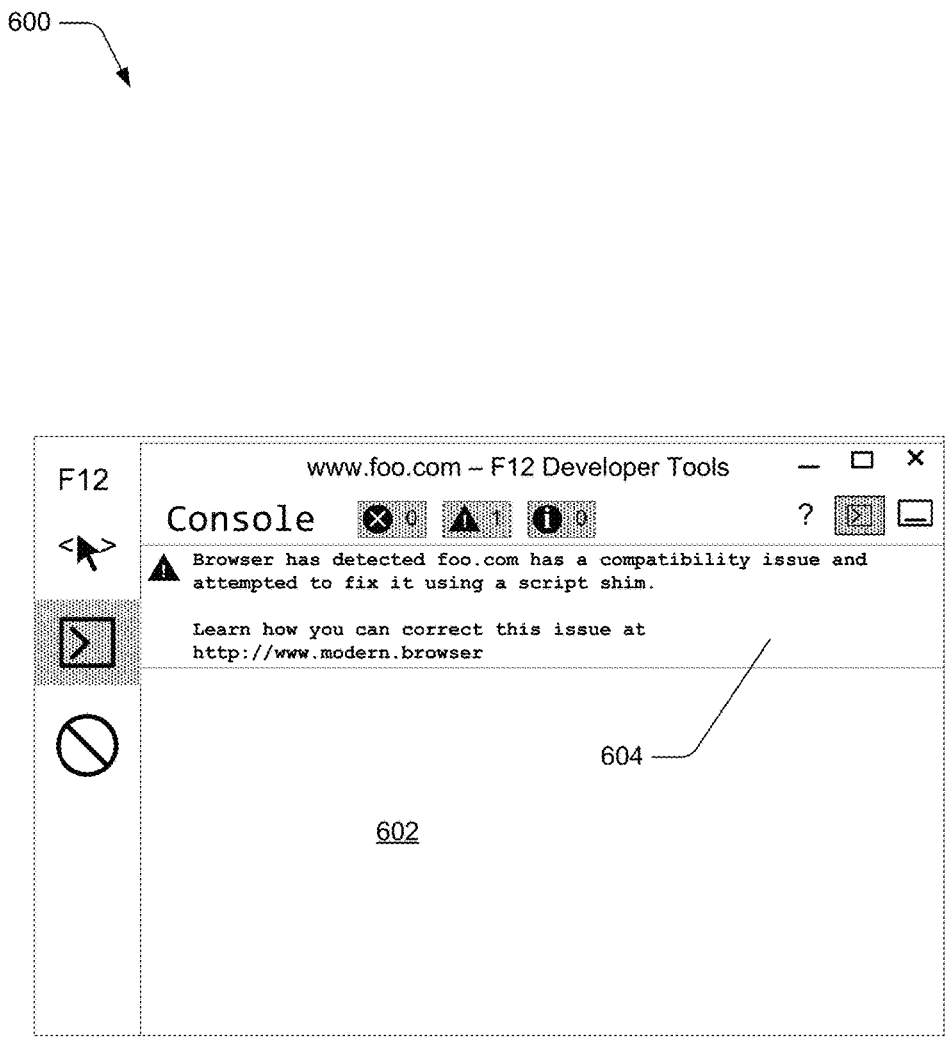
FIG. 6 illustrates an example implementation of a user interface for notifying a web developer of a compatibility issue in accordance with one or more embodiments.

FIG. 6 illustrates at 600 an example user interface 602. In contrast to the user interface depicted in FIG. 5, the user interface 602 represents an interface that may be displayed to a developer (e.g., the web developer 112) of a web resource (e.g., the web resource 114). In the illustrated example, the web resource 114 corresponds to "foo.com." The user interface 602 can be configured to display a visual notification 604 about the web resource 114. For instance, the user interface 602 can present information from the notification 404. The visual notification 604, for example, can indicate to the web developer 112 that a compatibility issue has been discovered with the web resource 114. The visual notification 604 can also indicate to the web developer 112 that the compatibility service 108 has caused a mitigation to be applied to the web resource 114. In the illustrated example, the visual notification 604 indicates that a compatibility issue is detected with "foo.com" and that a script shim has been applied by the web application 116 to mitigate the compatibility issue. Furthermore, the visual notification 604 provides the web developer 112 with information about how to fix the compatibility issue, e.g., by following a link to further information for fixing the compatibility issue.

According to one or more implementations, the visual notification 604 may notify the web developer 112 about compatibility issues with the web resource 114, that a compatibility element is applied to mitigate those issues, and how to fix the compatibility issues in other ways than those specifically described herein without departing from the spirit and the scope of implementations discussed herein. By way of example, the visual notification 604 may provide access to an executable that, when executed, automatically changes code of the web resource 114 to fix the compatibility issue.

The visual notification 604 may also provide other information not shown in the illustrated example without departing from the techniques described herein, such as statistics regarding clients to which the compatibility element was communicated, details regarding feedback received from those clients (e.g., percentage positive, percentage negative, number of clients responding, and so on), information enabling the web developer 112 to contact a support team that can help fix the compatibility issue, and so forth.

Having discussed some example user interfaces, consider now a discussion of some example procedures in accordance with one or more embodiments.

Example Procedures

The following discussion describes some example procedures for web resource compatibility with web applications in accordance with one or more embodiments. The example procedures may be employed in the environment 100 of FIG. 1, the system 1000 of FIG. 10, and/or any other suitable environment. Further, the example procedures may represent implementations of the example scenarios discussed above. In at least some embodiments, steps described for the various procedures can be implemented automatically and independent of user interaction.

Figure 7:
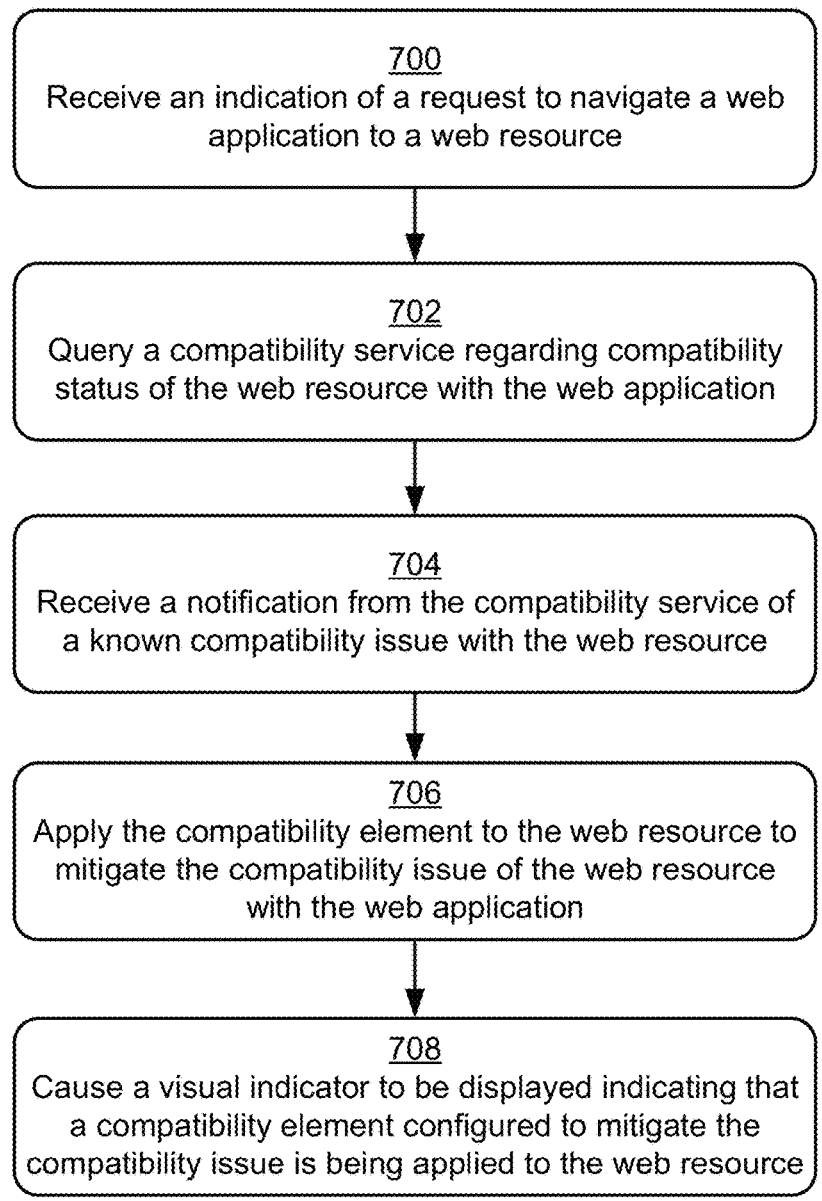
FIG. 7 is a flow diagram that describes steps in a method for receiving notification at a client about a compatibility issue with a web resource in accordance with one or more embodiments.

FIG. 7 is a flow diagram that describes steps in a method in accordance with one or more embodiments. The method describes an example procedure for receiving notification at a client about a compatibility issue with a web resource in accordance with one or more embodiments. In at least some implementations, the method can be performed by one or more components of the client device 102.

Step 700 receives an indication of a request to navigate a web application to a web resource. The indication, for instance, is received when a user enters a web address for the web resource 114 into an address bar of the web application 116 and selects to navigate to the entered address. The indication may be requested in other ways, such as by a selection to launch the web application 116, or a selection to perform some other action at the client device 102.

Step 702 queries a compatibility service regarding a compatibility status of the web resource with the web application. For example, the compatibility module 124 configures a query for communication to the compatibility service 108. The query may be configured to ascertain from the compatibility service 108 whether the web resource 114 has a compatibility issue with the web application 116. The compatibility module 124 causes the query to be communicated to the compatibility service 108, such as by employing the communication application 106 to communicate the query.

Step 704 receives a notification from the compatibility service of a known compatibility issue with the web resource. The received notification includes, for instance, a compatibility element configured to mitigate the compatibility issue. For example, the notification 306 including the compatibility element 308 is received by the client device 102. As discussed above, the compatibility element 308 is configured to mitigate a compatibility issue between the web resource 114 and the web application 116.

Step 706 applies the compatibility element to the web resource to mitigate the compatibility issue of the web resource with the web application. For example, the compatibility module 124 causes the compatibility element 308 to be applied to the web resource 114 when launched for presentation via the web application 116.

Step 708 causes a visual indicator to be displayed indicating that a compatibility element configured to mitigate the compatibility issue is applied to the web resource. For instance, in conjunction with presenting the web resource 114, the compatibility module 124 also causes a visual indicator (e.g., the visual indicator 504) to be displayed via the web application 116 when the web resource 114 is presented. The visual indicator enables a user to provide feedback regarding presentation of the web resource 114 via the web application with the compatibility element 308 applied. For example, the visual indicator 504 enables a user to provide positive or negative feedback regarding presentation of the web resource 114 with the compatibility element 308 applied.

Figure 8:
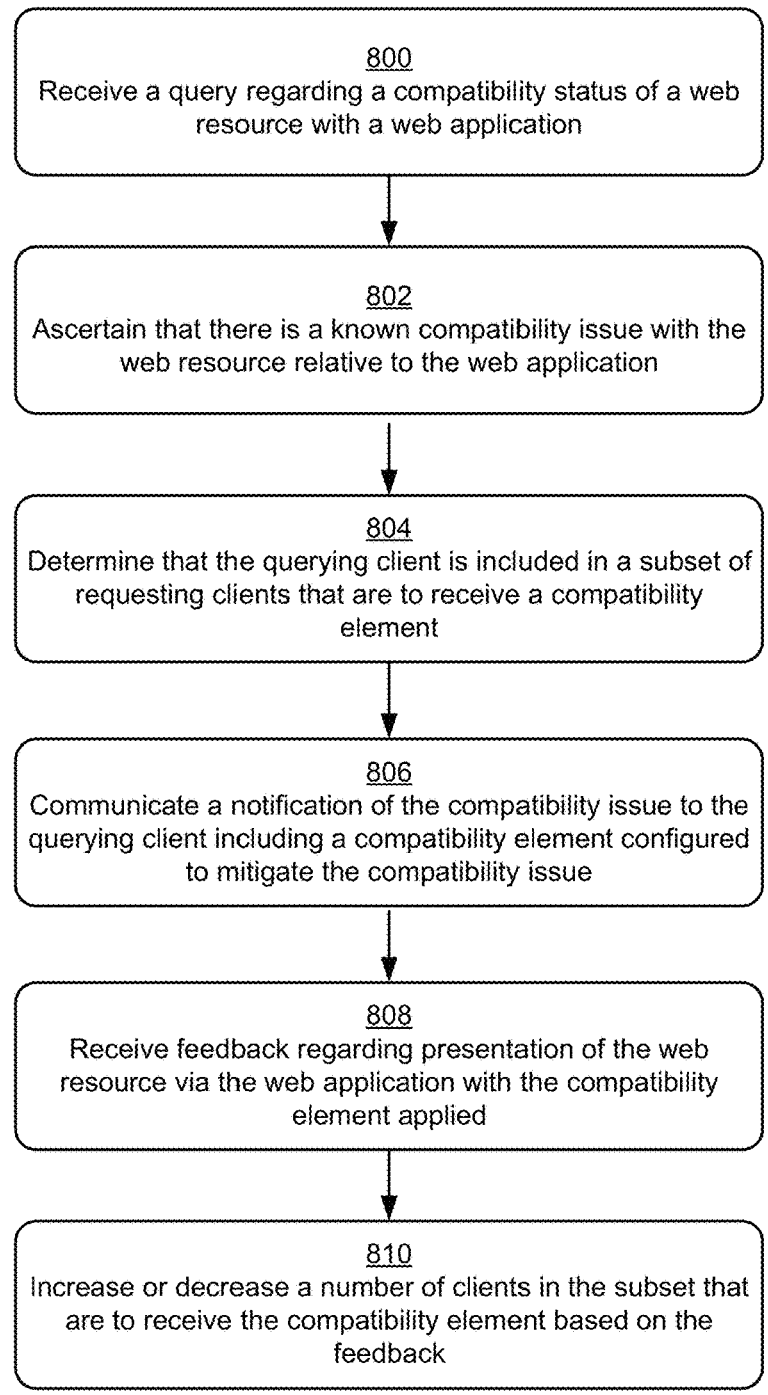
FIG. 8 is a flow diagram that describes steps in a method for communicating notifications from a compatibility service about a compatibility issue in accordance with one or more embodiments.

FIG. 8 is a flow diagram that describes steps in a method in accordance with one or more embodiments. The method describes an example procedure for communicating notifications from a compatibility service about a compatibility issue in accordance with one or more embodiments.

Step 800 receives a query regarding a compatibility status of a web resource with a web application. For example, the compatibility service 108 receives the compatibility query 304 from the client device 102. The compatibility query 304 queries whether the web resource 114 has an identified compatibility issue with the web application 116.

Step 802 ascertains that there is a known compatibility issue with the web resource relative to the web application. The compatibility service 108, for instance, identifies a record in the compat issues DB 120 that indicates there is a compatibility issue of the web resource 114 with the web application 116. According to one or more implementations, the record may also indicate that there is a "likely" compatibility issue, e.g., one that has not yet been validated based on client feedback or by developers of the web application 116.

Step 804 determines that the querying client is included in a subset of requesting client devices that are to receive the compatibility element. For example, the compatibility service 108 determines that the client device 102 is included in a subset (e.g., 1%) of clients that are to receive the compatibility element 308. As discussed in more detail above, the client device 102 can be selected for inclusion in this subset in a variety of manners.

Responsive to selecting the client device 102 to receive the compatibility element 308, the compatibility service 108 configures notification 306 for communication to the client device 102. The notification 306 is configured to include the compatibility element 308, which is configured to mitigate the compatibility issue between the web resource 114 and the web application 116. The compatibility service 108 may also configure the notification 306 to identify the known compatibility issue and to include the visual indicator 310.

Step 806 communicates a notification of the compatibility issue to the querying client including a compatibility element configured to mitigate the compatibility issue. The notification 306 is communicated to the client device 102 responsive to the determination made at step 804 that the client device 102 is included in a subset of clients that are to receive the compatibility element 308. According to various implementations, the compatibility service 108 causes the configured notification 306 to be sent to the client device 102.

Step 808 receives feedback regarding presentation of the web resource via the web application with the compatibility element applied. The compatibility service 108, for instance, receives the feedback 402 from the client device 102. For example, the feedback 402 indicates whether a user of the web application 116 indicates a positive or negative sentiment regarding presentation of the web resource 114 with the compatibility element 308 applied.

Step 810 increases or decreases a number of clients in the subset that are to receive the compatibility element based on the feedback. For instance, the compatibility service 108 can increase the number of clients that are to receive the compatibility element 308 (e.g. from 1% to 10%) when the feedback 402 is positive regarding presentation of the web resource 114 with the compatibility element 308 applied. Alternately, the compatibility service 108 can decrease the number of clients that are to receive the compatibility element 308 (e.g., from 1% to 0.5%) when the feedback 402 is negative regarding presentation of the web resource 114 with the compatibility element 308 applied.

According to various implementations, the number of clients in the subset to receive the compatibility element can be changed in other ways. For example, a vendor of the web application 116 may employ personnel to validate the compatibility issue of the web resource 114. The vendor may do so based on an alert received when a compatibility issue is added the compat issues DB 120, based on initial user feedback regarding the compatibility issue, and so on.

According to various implementations, the compatibility service 108 may enable the vendor of the web application 116 to increase or decrease the number of clients that receive the compatibility element 308. For instance, the vendor's personnel may test the compatibility issue with the web resource and determine that the compatibility issue is validated, e.g., is unlikely to be a false-positive. Consequently, the personnel may be able, through input to an interface provided by the compatibility service 108, to manually increase a number of clients that receive the compatibility element 308. By way of example, the vendor may increase the number of clients that receive the compatibility element from the initial 1% to 50%. Through the interface, the personnel may also be able to manually decrease the number of clients that receive the compatibility element 308, e.g., from 1% to zero. In other words, user input to manually increase or decrease a number of clients in the subset that are to receive the compatibility element can be received. Responsive to this input, the compatibility service 108 may increase or decrease the number of clients that receive the compatibility element.

Figure 9:
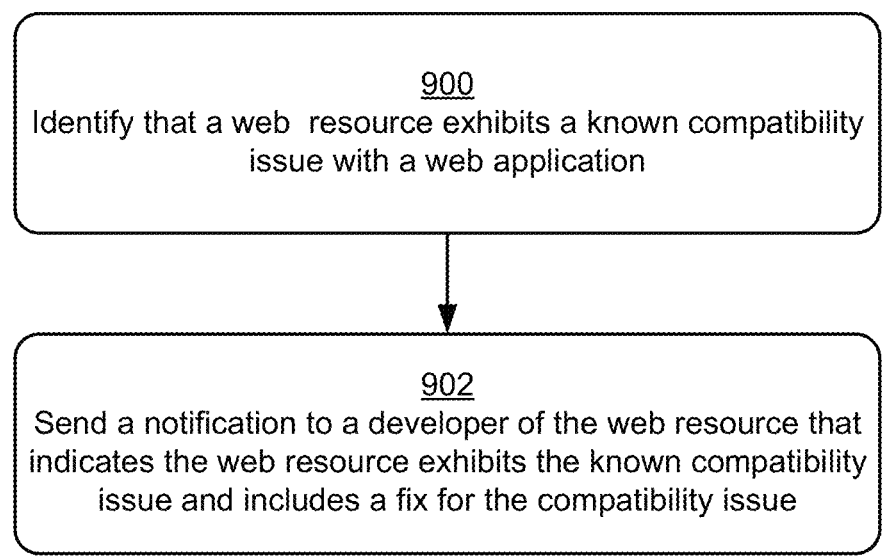
FIG. 9 is a flow diagram that describes steps in a method for notifying a web developer about compatibility issues with the web resource in accordance with one or more embodiments.

FIG. 9 is a flow diagram that describes steps in a method in accordance with one or more embodiments. The method describes an example procedure for notifying a web developer about compatibility issues with a web resource in accordance with one or more embodiments.

Step 900 identifies that a web resource exhibits a known compatibility issue with a web application. The compatibility service 108, for instance, validates via client feedback and through the "flighting" process described above that there is a known compatibility issue with the web resource 114.

Step 902 sends a notification to a developer of the web resource that indicates the web resource exhibits the known compatibility issue. The notification, for instance, includes and/or identifies a fix for the compatibility issue. By way of example, the compatibility service 108 sends the web developer 112 the notification 404. The notification 404 indicates to the web developer 112 that there is a compatibility issue between the web resource 114 and the web application 116. The notification 404 can also include the proposed compat fix 406, which indicates to the web developer 112 how to fix the compatibility issue with the web resource 114. As illustrated in FIG. 5, the proposed compat fix 406 may be included in the notification 404 as a hyperlink to documentation that indicates how to fix the web resource 114.

To send the notification 404, the compatibility service 108 accesses contact information of the web developer 112 that is included in the developer contact DB 126. The contact information accessed from the developer contact DB 126 may include any contact information that is suitable for sending the notification 404 to the web developer 112.

Having discussed some example procedures, consider now a discussion of an example system and device in accordance with one or more embodiments.

Example System and Device

Figure 10:
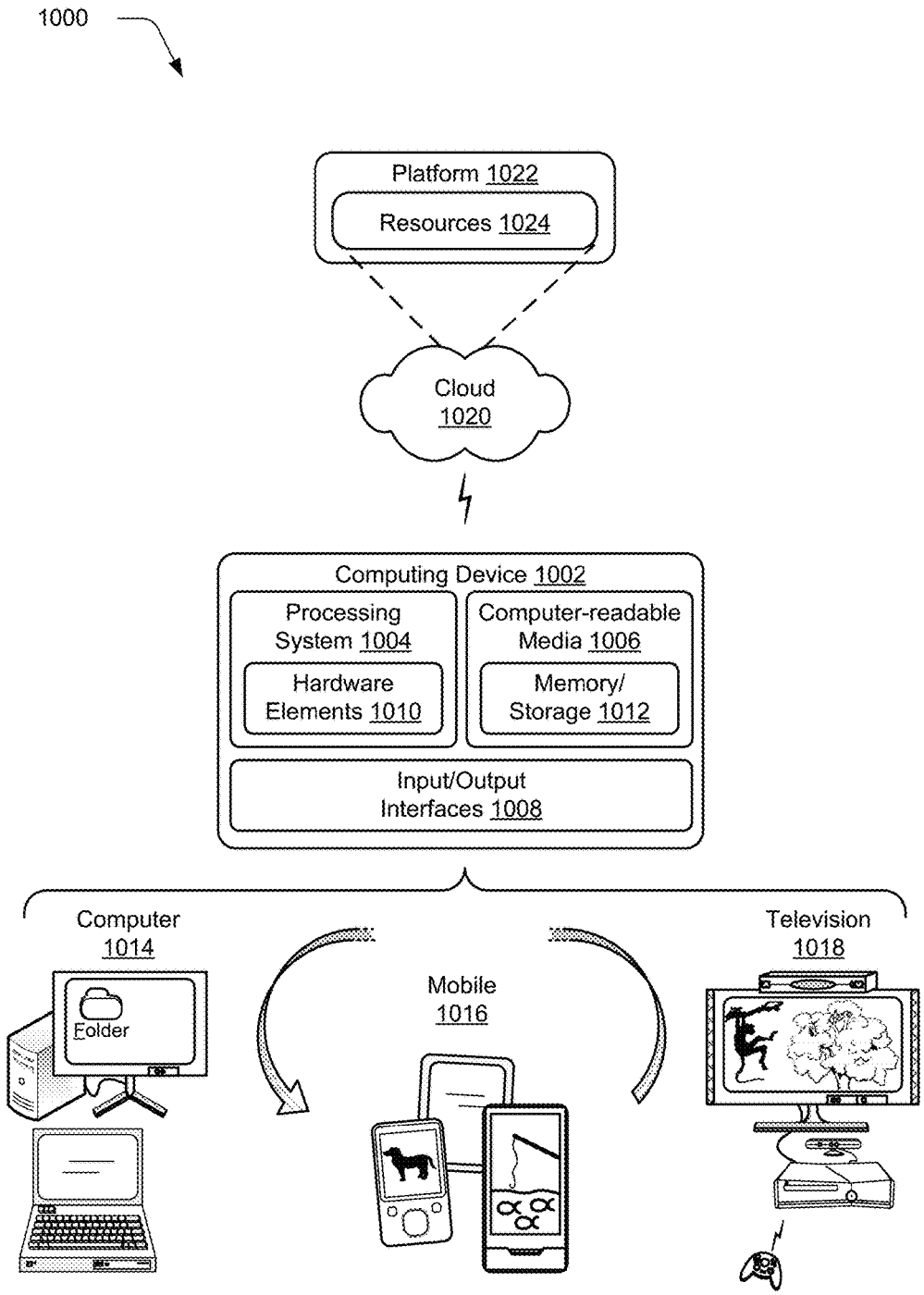
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client device 102, the compatibility service 108, the web server 110 and/or the web developer 112 discussed above can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the compatibility service 108, the web server 110 and/or the web developer 112 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for web resource compatibility with web applications are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A client device comprising:
   one or more processors; and
   computer-readable storage media storing instructions thereon that are executable by the one or more processors to perform operations including:
   receiving an indication of a request to navigate a web application to a web resource;
   querying a compatibility service regarding a compatibility status of the web resource with the web application;
   receiving a notification from the compatibility service of a known compatibility issue with the web resource, the notification including a compatibility element comprising injectable code that, when executed by the web application, mitigates the compatibility issue by intercepting calls made by the web resource and adjusting at least one characteristic associated with the calls;
   responsive to receiving the notification from the compatibility service, injecting the compatibility element in connection with launching the web resource to mitigate the compatibility issue;
   causing a visual indicator to be displayed indicating that the compatibility element is being applied to the web resource, the visual indicator enabling a user to provide feedback regarding presentation of the web resource via the web application; and
   receiving feedback from the user via the visual indicator and causing to be communicated to the compatibility service an indication of whether the compatibility element successfully mitigated the compatibility issue based at least in part on the feedback received from the user.

2. A client device as recited in claim 1, wherein the web application is a web browser, the web resource is a web page, and the known compatibility issue involves compatibility of the web page with the web browser.

3. A client device as recited in claim 1, wherein said receiving the notification indicates that the client device is included in a subset of clients selected to receive the compatibility element.

4. A client device as recited in claim 1, wherein adjusting the at least one characteristic associated with the calls includes at least one of:
   changing one or more arguments passed in the calls between the web resource and the web application;
   handling one or more operations associated with the calls in lieu of the calls being handled by a handler originally associated with the calls; or
   redirecting the handling of the one or more operations from the handler to a different handler.

5. A client device as recited in claim 1, wherein the visual indicator enables the user to provide positive feedback regarding the presentation of the web resource via the web application.

6. A client device as recited in claim 1, wherein the visual indicator enables the user to provide negative feedback regarding the presentation of the web resource via the web application.

7. A client device as recited in claim 1, wherein the operations further include disabling the compatibility element responsive to the user providing negative feedback regarding the presentation of the web resource via the web application.

8. A client device as recited in claim 1, wherein the visual indicator is displayed in conjunction with display of the web resource via the web application.

9. A method comprising:
   receiving a query regarding a compatibility status of a web resource with a web application;
   ascertaining that there is a known compatibility issue with the web resource relative to the web application;
   identifying a compatibility element corresponding to the known compatibility issue from a data structure that includes a plurality of compatibility elements each individually configured to mitigate a corresponding compatibility issue;
   determining that a client from which the query was received is included in a subset of clients that requested the web resource and is to receive the compatibility element configured to mitigate the known compatibility issue;
   communicating a notification of the known compatibility issue to the client, the notification including the compatibility element, the compatibility element comprising injectable code that, when executed by the web application, mitigates the compatibility issue by intercepting calls made by the web resource and adjusting at least one characteristic associated with the calls;

receiving feedback from the client indicating whether the compatibility element successfully mitigated the compatibility issue with the web resource; and adjusting a number of clients of the subset that are to receive the compatibility element based, in part, on the feedback from the client by
increasing the number of clients in the subset responsive to receiving positive feedback application of the compatibility element.

10. A method as recited in claim 9, wherein the notification includes a visual indicator to be displayed via the web application to enable a user to provide the feedback indicating whether the compatibility element successfully mitigated the compatibility issue with the web resource.

11. A method as recited in claim 9, further comprising receiving additional feedback from one or more additional clients of the subset of clients, the additional feedback indicating whether the compatibility element successfully mitigated the compatibility issue with the web resource for the one or more additional clients.

12. A method as recited in claim 9, further comprising:
decreasing the number of clients in the subset that are to receive the compatibility element responsive to receiving the negative feedback from the subset of clients regarding presentation of the web resource via the web application with the compatibility element applied.

13. A method as recited in claim 9, further comprising increasing or decreasing a number of clients to which the notification of the known compatibility issue is communicated in response to receiving user input to increase or decrease a number of clients in the subset that are to receive the compatibility element.

14. A method as recited in claim 9, further comprising sending, to clients to which the notification was communicated, an updated notification indicating to disable the compatibility element based on the negative feedback regarding presentation of the web resource via the web application with the compatibility element applied.

15. A method as recited in claim 9, further comprising notifying a developer of the web resource regarding feedback received that indicates the compatibility element mitigates the known compatibility issue with the web resource.

16. A method as recited in claim 15, wherein a notification of the known compatibility issue that is sent to the developer indicates how to fix the known compatibility issue with the web resource.

17. A method as recited in claim 9, further comprising identifying the known compatibility issue by:
crawling the web resource to identify the compatibility issue with the web resource by matching a pattern indicative of the known compatibility issue that is exhibited by the web resource; and
maintaining information about the known compatibility issue with the web resource.

18. A method as recited in claim 17, wherein the pattern is indicative of a known compatibility issue with mobile-specific web resources.

19. A method comprising:
identifying that a web resource exhibits a known compatibility issue with a web application;
identifying a compatibility element corresponding to the known compatibility issue from a data structure that includes a plurality of compatibility elements each individually configured to mitigate a corresponding compatibility issue;
communicating a compatibility notification of the known compatibility issue to a subset of clients that requested the web resource, the compatibility notification including the compatibility element, the compatibility element comprising injectable code that, when executed by the web application, mitigates the compatibility issue by intercepting calls made by the web resource and adjusting at least one characteristic associated with the calls;
receiving, from at least a threshold number of clients, positive feedback indicating whether the compatibility element successfully mitigated the compatibility issue with the web resource;
generating, responsive to receiving the positive feedback from the threshold number of clients, a developer notification to be sent to the developer of the web resource, the developer notification including an indication that the web resource exhibits the known compatibility issue and an indication of a fix for the known compatibility issue; and
sending the developer notification to the developer of the web resource.

20. A method as recited in claim 19, further comprising communicating the compatibility element to additional clients responsive to receiving the positive feedback.

* * * * *